(12) United States Patent
Orazem

(10) Patent No.: US 10,155,468 B1
(45) Date of Patent: Dec. 18, 2018

(54) METHOD AND APPARATUS FOR CONTROLLING AUXILIARY LIGHTING USING A VEHICLE ELECTRIC PLUG

(71) Applicant: Meyer Products, LLC, Cleveland, OH (US)

(72) Inventor: Louis Orazem, Chardon, OH (US)

(73) Assignee: Meyer Products, LLC, Cleveland, OH (US)

(*) Notice: Subject to any disclaimer, the term of this patent is extended or adjusted under 35 U.S.C. 154(b) by 0 days.

(21) Appl. No.: 15/694,141

(22) Filed: Sep. 1, 2017

(51) Int. Cl.
*B60Q 1/00* (2006.01)
*B60Q 1/34* (2006.01)
*B60Q 1/18* (2006.01)
*B60Q 1/44* (2006.01)
*E01H 5/12* (2006.01)
*E01H 5/06* (2006.01)

(52) U.S. Cl.
CPC ........... *B60Q 1/0094* (2013.01); *B60Q 1/18* (2013.01); *B60Q 1/34* (2013.01); *B60Q 1/44* (2013.01); *E01H 5/061* (2013.01); *E01H 5/12* (2013.01)

(58) Field of Classification Search
CPC ...... B60Q 1/0088; B60Q 1/0094; B60Q 1/18; B60Q 1/305; B60Q 1/34; B60Q 1/44; B60Q 2900/30; H01R 2201/26
See application file for complete search history.

(56) References Cited

U.S. PATENT DOCUMENTS

| | | |
|---|---|---|
| 4,280,062 A | 7/1981 | Miller |
| 4,781,393 A | 11/1988 | Jeter |
| 5,420,480 A | 5/1995 | Knepel et al. |
| 5,524,368 A | 6/1996 | Struck et al. |
| 5,607,221 A | 3/1997 | Justus |
| 5,701,116 A | 12/1997 | Hoekstra |
| 5,769,526 A | 6/1998 | Shaffer |
| 5,770,999 A * | 6/1998 | Rhodes ............... B60Q 1/00 307/10.8 |
| 5,828,299 A | 10/1998 | Chen |
| 5,841,203 A | 11/1998 | Chambers |
| 5,904,261 A | 5/1999 | Belinky et al. |
| 5,971,799 A | 10/1999 | Swade |
| 6,005,300 A | 12/1999 | Kelly |
| 6,112,139 A | 8/2000 | Schubert et al. |

(Continued)

FOREIGN PATENT DOCUMENTS

DE 29700668 3/1997

OTHER PUBLICATIONS

International Search Report and Written Opinion, PCT/US2016/013731, European Patent Office, dated May 6, 2016.

*Primary Examiner* — Orlando Bousono
(74) *Attorney, Agent, or Firm* — Emerson Thomson Bennett; Roger D. Emerson; Nicholas J. Bagnolo

(57) ABSTRACT

An auxiliary lighting system may operate with a controller that is electrically connectable to a vehicle's electric plug. The controller may have a microprocessor that is programmed to perform at least one of these functions: (A) prevent a front facing auxiliary turn signal light from going into an ON condition when a brake on the vehicle has been activated; (B) operate auxiliary turn signal lights into alternating ON and OFF conditions that match the simultaneous ON and OFF conditions of the vehicle's turn signals; and, (C) prevent the vehicle's electronic control unit from detecting that the controller is electrically connected to the electric plug.

20 Claims, 28 Drawing Sheets

(56) References Cited

U.S. PATENT DOCUMENTS

| | | | |
|---|---|---|---|
| 6,138,388 A | 10/2000 | Kost et al. | |
| 6,153,975 A * | 11/2000 | Perdec | B60R 16/0207 |
| | | | 307/10.1 |
| 6,177,865 B1 | 1/2001 | Bryant et al. | |
| 6,232,722 B1 | 5/2001 | Bryant et al. | |
| 6,259,170 B1 | 7/2001 | Limoge | |
| 6,265,829 B1 | 7/2001 | Perdec | |
| 6,322,238 B1 | 11/2001 | Barr | |
| 6,362,727 B1 | 3/2002 | Guy, Jr. | |
| 6,396,210 B1 | 5/2002 | Menze | |
| 6,504,306 B2 | 1/2003 | Menze | |
| 6,545,600 B1 | 4/2003 | Boner | |
| 6,700,310 B2 | 3/2004 | Maue et al. | |
| RE38,665 E | 12/2004 | Struck et al. | |
| 7,137,724 B2 | 11/2006 | Menze et al. | |
| 7,224,262 B2 | 5/2007 | Simon et al. | |
| 7,279,640 B2 | 10/2007 | White et al. | |
| 7,290,359 B2 | 11/2007 | Potak | |
| 7,341,264 B2 | 3/2008 | Swannie | |
| 7,400,058 B1 | 7/2008 | Wayne et al. | |
| 7,463,136 B2 | 12/2008 | Ungerman | |
| 7,557,699 B2 | 7/2009 | Walton | |
| 7,661,210 B2 | 2/2010 | Shepherd | |
| 7,973,651 B2 | 7/2011 | Stiles et al. | |
| 8,061,879 B2 | 11/2011 | Simmons et al. | |
| 8,068,961 B2 | 11/2011 | Menze | |
| 8,129,909 B1 | 3/2012 | Hoekstra | |
| 8,185,276 B2 | 5/2012 | Buckbee et al. | |
| 8,203,445 B2 | 6/2012 | Recker et al. | |
| 8,552,852 B1 | 10/2013 | Hertz et al. | |
| 8,719,142 B1 | 5/2014 | Odom | |
| 9,278,645 B1 | 3/2016 | Orazem | |
| 9,346,394 B1 * | 5/2016 | Orazem | B60Q 1/0088 |
| 9,751,452 B2 | 9/2017 | Orazem | |
| 2003/0039126 A1 | 2/2003 | Fox | |
| 2003/0098786 A1 | 5/2003 | Bishop | |
| 2004/0056779 A1 | 3/2004 | Rast | |
| 2005/0047031 A1 | 3/2005 | Naito | |
| 2005/0152145 A1 | 7/2005 | Currie | |
| 2007/0120654 A1 | 5/2007 | Walton | |
| 2008/0073090 A1 | 3/2008 | Harris | |
| 2008/0079552 A1 | 4/2008 | Schultz | |
| 2008/0224843 A1 | 9/2008 | Overline | |
| 2008/0272699 A1 | 11/2008 | Capenos | |
| 2010/0060439 A1 | 3/2010 | Fitzgerald | |
| 2011/0237090 A1 | 9/2011 | Ehrlich | |
| 2012/0134389 A1 | 5/2012 | Pahlavan et al. | |
| 2013/0063026 A1 * | 3/2013 | Stickley | B60Q 1/2603 |
| | | | 315/77 |
| 2014/0022389 A1 | 1/2014 | Kageta | |
| 2014/0052335 A1 | 2/2014 | Moon, Jr. et al. | |
| 2016/0035156 A1 | 2/2016 | Andrus | |
| 2016/0121792 A1 | 5/2016 | Christopherson | |
| 2016/0207447 A1 * | 7/2016 | Orazem | B60Q 1/2661 |
| 2016/0207451 A1 * | 7/2016 | Orazem | B60Q 1/0088 |
| 2016/0212829 A1 * | 7/2016 | Orazem | H05B 37/0272 |
| 2017/0100975 A1 * | 4/2017 | Ruiz | B60D 1/64 |
| 2017/0349093 A1 * | 12/2017 | Peacock | B60Q 1/46 |

\* cited by examiner

US 10,155,468 B1

METHOD AND APPARATUS FOR CONTROLLING AUXILIARY LIGHTING USING A VEHICLE ELECTRIC PLUG

TECHNICAL FIELD

This invention concerns methods and apparatuses related to the operation of auxiliary lighting using a vehicle's electric plug.

BACKGROUND

FIG. 1 illustrates a known vehicle 10 in schematic representation showing numerous components including a battery 12 and exterior vehicle lights. The exterior vehicle lights include headlights 14 which illuminate a ground surface in front of the vehicle 10 upon which the vehicle 10 travels as is well known to those of skill in the art. The headlights 14 may include low and high beams. The exterior vehicle lights may also include one or more supplemental lights 16 which may be positioned at the front and the rear of the vehicle 10 and sometimes the sides of the vehicle as well. Numerous supplemental lights 16 are well known and include turn signal lights 15, park lights, running lights, and brake lights, though brake lights 18 typically are only provided at the rear of the vehicle 10, as shown. As is also known, sometimes the same light source, such as a light bulb or light emitting diode (LED), may serve more than one supplemental light purpose; such as a brake light and a turn signal light. The vehicle may have an electronic control unit (ECU) 28 that controls one or more of the electrical system or subsystems in the vehicle 10 in a known manner. As one non-limiting example, the ECU 28 may be used to control a rearview camera 48 which operates in a known manner.

Still referring to FIG. 1, an operator adjustable vehicle light control 20, typically positioned within the vehicle interior, can be adjusted by a user in order to control the exterior vehicle lights; such as to turn the exterior vehicle lights into ON and OFF conditions and/or adjust the intensity of illumination. Vehicle light wiring 22 is used to electrically connect the operator adjustable vehicle light control 22 to the vehicle headlights 14, and the supplemental lights 16 including turn signal lights 15. The vehicle 10 may include at least one brake 24, four shown at the four wheels, which are operable to slow down the vehicle's speed in a known manner. A braking device 26, such as a brake pedal, may be operated by the user to activate the brakes 24. In order to illuminate the brake lights 18, the braking device 26 may be electrically connected to the vehicle light wiring 22, as shown. As the basic operation of external vehicle lights is well known to those of skill in the art, further details will not be provided here.

FIG. 2 illustrates the vehicle 10 of FIG. 1 but with an auxiliary implement 30, in the form of a snowplow, mounted onto the front of the vehicle 10. An operator adjustable auxiliary implement control 34 may be operated by the user to operate one or more functions of the auxiliary implement 30; such as to raise and lower a snowplow blade 36 by way of a hydraulic unit 38. The vehicle's headlights 14 and front positioned supplemental lights 16 which may include turn signal lights 15, however, are commonly obscured by the auxiliary implement 30. Therefore, an auxiliary lighting system 32, including auxiliary headlights 40 and auxiliary supplemental lights 42 including auxiliary turn signal lights 46, are used in place of, or in addition to, the vehicle headlights 14 and supplemental lights 16. While known auxiliary lighting systems generally work well for their intended purposes, they are known to have problems.

One problem with known auxiliary lighting systems, with reference to FIGS. 1 and 2, is that numerous electrical connections must be made between the auxiliary wiring 44 and the vehicle light wiring 22 so that the auxiliary headlights 40 and auxiliary supplemental lights 42 can be coordinated, powered, and controlled by the vehicle's existing electrical system including the operator adjustable vehicle light control 20. Current installation techniques involve disconnecting the vehicle's original equipment manufacturer ("OEM") light wiring 22, often in the form of a harness, and splicing or otherwise connecting the new auxiliary wiring 44, also often in the form of a harness, to the OEM wiring 22 in order to provide auxiliary lighting. This part of the process is labor intensive and objectionable as it requires altering the vehicle's existing electrical system. For example, the time necessary to initially install and mount a snowplow that utilizes an auxiliary lighting system to a vehicle is approximately four hours. The process of installing the auxiliary wiring 44 consumes approximately two and one half hours of that time. Furthermore, given the complexity of the electrical interconnections required, an electrical technician should be used to assure that proper connections have been made.

Therefore, a simpler installation process would reduce the amount of time and effort necessary to install an auxiliary implement utilizing an auxiliary lighting system and would eliminate the need for major alterations to the vehicle's OEM electrical systems.

With reference now to FIG. 3, many vehicles that are suited to operate an auxiliary implement, such as a snowplow or spreader, are trucks or other vehicles that include a trailer hitch 52 that includes a hitch receiver 54 and a trailer plug 50 that may be protected with a lid or cover 56. It is believed that approximately 95% of trucks currently manufactured feature trailer hitches. More recently, manufacturers offer trucks with towing packages, including a hitch receiver and a trailer plug, installed as standard equipment. Trucks that do not include these features as standard equipment from the manufacturer have the towing package available as an option from the factory. Vehicles other than trucks, such as cars and all-terrain vehicles (also known as "ATVs") may also offer such hitch receivers and/or trailer plugs and may also be candidates according to some aspects of the present teaching. A hitch receiver 54, as is well known to those of skill in the art, is a tube adapted to receive a portion of a trailer or other device so that the trailer or other device can be physically attached to the vehicle.

FIG. 4 shows a vehicle 10A that is similar to vehicle 10 shown in FIGS. 1 and 2 except for the addition of trailer plug 50. A trailer plug, as is well known to those of skill in the art, is a type of electric plug. Each trailer plug 50 includes wiring that indicates the condition of the vehicle supplemental lights 16. Trailer plugs come in multiple varieties and are designed to power and control trailer features such as brake lights, turn signals, running lights, and the like. The two most common trailer plugs are the 7-way plug and the 4-way plug, which will be discussed further below. Many trucks now come with the 7-way plug installed from the factory, as discussed above. Other common plugs include a 6-way, a 5-way, and a 4-way plug. There are also a wide variety of European type trailer plugs with different wiring configurations than those just described.

The use of a controller with a vehicle's electric plug to simplify the installation process of an auxiliary lighting system is disclosed in Applicant's U.S. patent application Ser. No. 13/356,618 filed Nov. 20, 2016 entitled METHOD AND APPARATUS FOR INSTALLING AND OPERATING AN AUXILIARY LIGHTING SYSTEM USING A VEHICLE LIGHT PLUG, and Applicant's U.S. patent application Ser. No. 14/997,341 filed Jan. 15, 2016 entitled METHOD AND APPARATUS FOR INSTALLING AND OPERATING AN AUXILIARY LIGHTING SYSTEM USING A VEHICLE ELECTRIC PLUG, both of which are incorporated herein by reference in their entirety. While these auxiliary lighting systems work well for their intended purposes, a few problems remain.

One problem is that, depending on the particular design of the vehicle's electric plug, the trailer turn signal and brake signal may come on a common wire. In this case, the auxiliary turn signal light(s) may turn "ON" when the vehicle's brakes are applied. This may be undesirable when the auxiliary turn signal light(s) is front facing.

Another problem is related to known taillight adaptors. Known taillight adaptors prevent the trailer's turn signal lights from turning "ON" when the vehicle's brakes are applied. The resulting problem, however, is that the adaptor also prevents the same lights from operating as hazard lights.

Yet another known problem with the use of a vehicle's electric plug is related to the fact that some vehicles have electronic control units that are configured to disable certain features when the electric plug is used. Some vehicles, for example, automatically disable at least a portion of the vehicle's rearview camera system when the vehicle's electric plug is in use. Other examples include the disablement of certain peripheral object sensors when the vehicle's electric plug is in use. Such disabling functionality may be helpful when a trailer is attached to the back of the vehicle but may be undesirable when the vehicle's electric plug is used in non-trailer applications.

Improved auxiliary lighting systems and controllers are needed to reduce or eliminate these problems.

SUMMARY

According to some aspects of the present teaching, an auxiliary apparatus may be used with an associated vehicle having: a vehicle light that is designed to illuminate a ground surface in front of the vehicle; and, an electric plug. The auxiliary apparatus may comprise: an auxiliary snow and/or ice removal implement that: is removably mountable to the vehicle; and, obscures light from the vehicle light when mounted to the vehicle; an auxiliary lighting system that: is for use with the auxiliary snow and/or ice removal implement; and, comprises at least one auxiliary headlight designed to illuminate the ground surface in front of the vehicle; and, a controller that: is electrically connectable to the electric plug and the auxiliary lighting system; and, comprises a microprocessor that is programmed to perform at least one of the following function sets: function set A: (1) operate a front facing auxiliary turn signal light of the auxiliary lighting system into an ON condition when the electric plug indicates that the vehicle has a turn signal that is in an ON condition; (2) operate the front facing auxiliary turn signal light into an OFF condition when the electric plug indicates that the vehicle's turn signal is in an OFF condition; and, (3) operate to prevent the front facing auxiliary turn signal light from going into an ON condition when the electric plug indicates that: (a) the vehicle's turn signal is in an OFF condition; and, (b) a brake on the vehicle has been activated; function set B: (1) operate a first auxiliary turn signal light of the auxiliary lighting system into an ON condition when the electric plug indicates that the vehicle has a first turn signal that is in an ON condition; (2) operate the first auxiliary turn signal light into an OFF condition when the electric plug indicates that the vehicle's first turn signal is in an OFF condition; (3) operate a second auxiliary turn signal light of the auxiliary lighting system into an ON condition when the electric plug indicates that the vehicle has a second turn signal that is in an ON condition; (4) operate the second auxiliary turn signal light into an OFF condition when the electric plug indicates that the vehicle's second turn signal is in an OFF condition; (5) operate to prevent the first auxiliary turn signal light from going into an ON condition when the electric plug indicates that: (a) the vehicle's first turn signal is in an OFF condition; and, (b) a brake on the vehicle has been activated; (6) operate to prevent the second auxiliary turn signal light from going into an ON condition when the electric plug indicates that: (a) the vehicle's second turn signal is in an OFF condition; and, (b) a brake on the vehicle has been activated; (7) operate the first and second auxiliary turn signal lights into ON and OFF conditions that match the ON and OFF conditions of the vehicle's first and second turn signals when the electric plug indicates that the vehicle's first and second turn signals are simultaneously alternating between ON and OFF conditions; and, function set C: (1) operate at least one auxiliary light of the auxiliary lighting system based on an indication from the electric plug; and, (2) operate to prevent an electronic control unit on the vehicle from detecting that the controller is electrically connected to the electric plug.

According to some aspects of the present teaching, an auxiliary apparatus may be used with an associated vehicle having an electric plug. The auxiliary apparatus may comprise: an auxiliary implement that: is removably mountable to the vehicle; and, obscures light from at least one vehicle light designed to illuminate a ground surface in front of the vehicle when mounted to the vehicle; an auxiliary lighting system for use with the auxiliary implement; and, a controller that: is electrically connectable to the electric plug and, the auxiliary lighting system; and, comprises a microprocessor that is programmed to perform at least one of the following function sets: function set A: (1) operate a front facing auxiliary turn signal light of the auxiliary lighting system into an ON condition when the electric plug indicates that the vehicle has a turn signal that is in an ON condition; (2) operate the front facing auxiliary turn signal light into an OFF condition when the electric plug indicates that the vehicle's turn signal is in an OFF condition; and, (3) operate to prevent the front facing auxiliary turn signal light from going into an ON condition when the electric plug indicates that: (a) the vehicle's turn signal is in an OFF condition; and, (b) a brake on the vehicle has been activated; function set B: (1) operate a first auxiliary turn signal light of the auxiliary lighting system into an ON condition when the electric plug indicates that the vehicle has a first turn signal that is in an ON condition; (2) operate the first auxiliary turn signal light into an OFF condition when the electric plug indicates that the vehicle's first turn signal is in an OFF condition; (3) operate a second auxiliary turn signal light of the auxiliary lighting system into an ON condition when the electric plug indicates that the vehicle has a second turn signal that is in an ON condition; (4) operate the second auxiliary turn signal light into an OFF condition when the electric plug indicates that the vehicle's second turn signal is in an OFF condition; (5) operate to prevent the first auxiliary turn signal light from going into an ON condition when the electric plug indicates that: (a) the vehicle's first turn signal is in an OFF condition; and, (b) a brake on the vehicle has been activated; (6) operate to prevent the second auxiliary turn signal light from going into an ON condition when the electric plug indicates that: (a) the vehicle's second turn signal is in an OFF condition; and, (b) a brake on the vehicle has been activated; and, (7) operate the first and second auxiliary turn signal lights into ON and OFF conditions that match the ON and OFF conditions of the vehicle's first and second turn signals when the electric plug indicates that the vehicle's first and second turn signals are simultaneously alternating between ON and OFF conditions; and, function set C: (1) operate at least one auxiliary light of the auxiliary lighting system based on an indication from the electric plug; and, (2) operate to prevent an electronic control unit on the vehicle from detecting that the controller is electrically connected to the electric plug.

According to some aspects of the present teaching, an auxiliary lighting system and controller may be used with: (A) an associated vehicle having: a vehicle light that is designed to illuminate a ground surface in front of the vehicle; and, an electric plug; and, (B) an associated implement that obscures light from the vehicle light. The auxiliary lighting system and controller may comprise: an auxiliary lighting system that; is removably mountable to at least one of the vehicle and the implement; and, comprises at least one auxiliary headlight designed to illuminate the ground surface in front of the vehicle; and, a controller that: is electrically connectable to the electric plug and the auxiliary lighting system; and, comprises a microprocessor that is programmed to perform at least one of the following function sets: function set A: (1) operate a front facing auxiliary turn signal light of the auxiliary lighting system into an ON condition when the electric plug indicates that the vehicle has a turn signal that is in an ON condition; (2) operate the front facing auxiliary turn signal light into an OFF condition when the electric plug indicates that the vehicle's turn signal is in an OFF condition; and, (3) operate to prevent the front facing auxiliary turn signal light from going into an ON condition when the electric plug indicates that: (a) the vehicle's turn signal is in an OFF condition; and, (b) a brake on the vehicle has been activated; function set B: (1) operate a first auxiliary turn signal light of the auxiliary lighting system into an ON condition when the electric plug indicates that the vehicle has a first turn signal that is in an ON condition; (2) operate the first auxiliary turn signal light into an OFF condition when the electric plug indicates that the vehicle's first turn signal is in an OFF condition; (3) operate a second auxiliary turn signal light of the auxiliary lighting system into an ON condition when the electric plug indicates that the vehicle has a second turn signal that is in an ON condition; (4) operate the second auxiliary turn signal light into an OFF condition when the electric plug indicates that the vehicle's second turn signal is in an OFF condition; (5) operate to prevent the first auxiliary turn signal light from going into an ON condition when the electric plug indicates that: (a) the vehicle's first turn signal is in an OFF condition; and, (b) a brake on the vehicle has been activated; (6) operate to prevent the second auxiliary turn signal light from going into an ON condition when the electric plug indicates that: (a) the vehicle's second turn signal is in an OFF condition; and, (b) a brake on the vehicle has been activated; and, (7) operate the first and second auxiliary turn signal lights into ON and OFF conditions that match the ON and OFF conditions of the vehicle's first and second turn signals when the electric plug indicates that the vehicle's first and second turn signals are simultaneously alternating between ON and OFF conditions; and, function set C (1) operate at least one auxiliary light of the auxiliary lighting system based on an indication from the electric plug; and, (2) operate to prevent an electronic control unit on the vehicle from detecting that the controller is electrically connected to the electric plug.

Numerous benefits and advantages of this invention will become apparent to those skilled in the art to which it pertains upon reading and understanding of the following detailed specification.

DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 5:
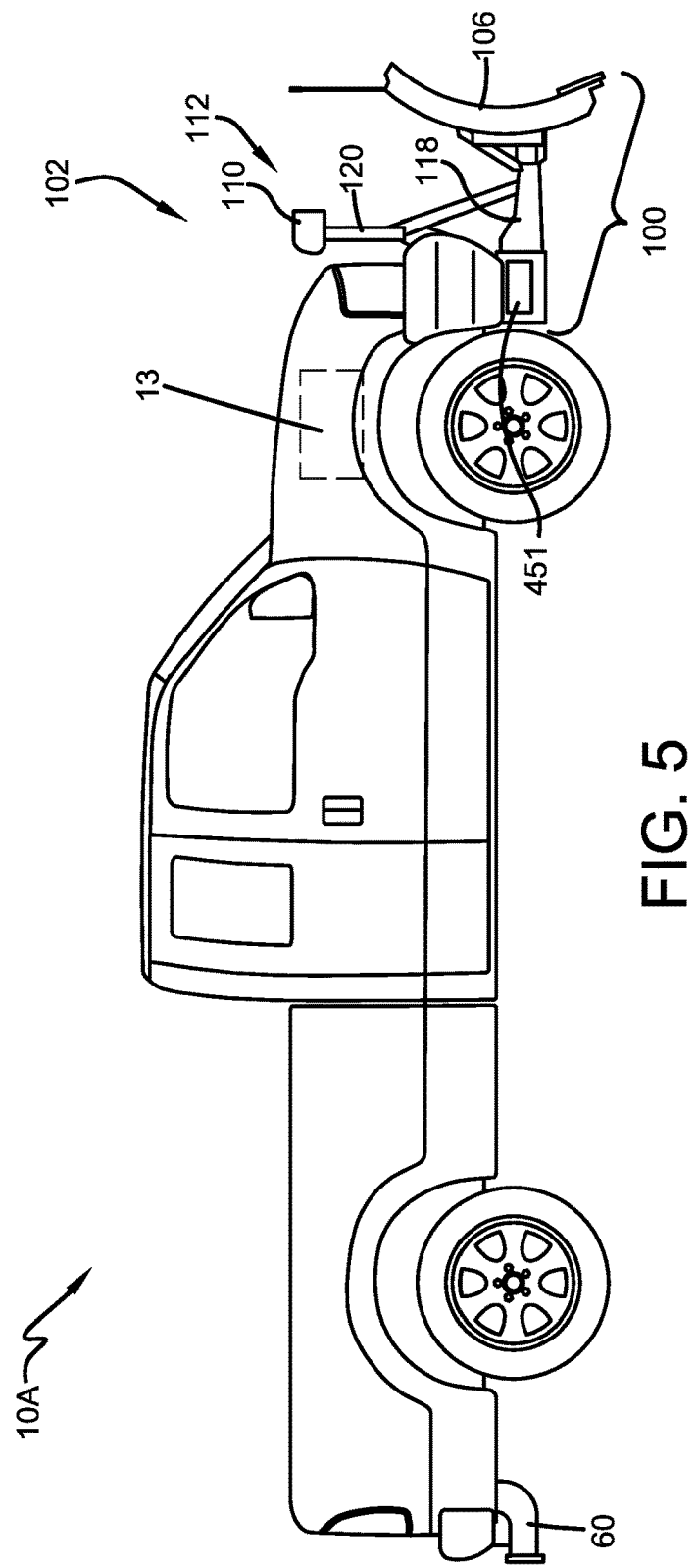
FIG. 5 a side view of a vehicle with a snowplow implement and a vehicle electric plug.
Figure 6:
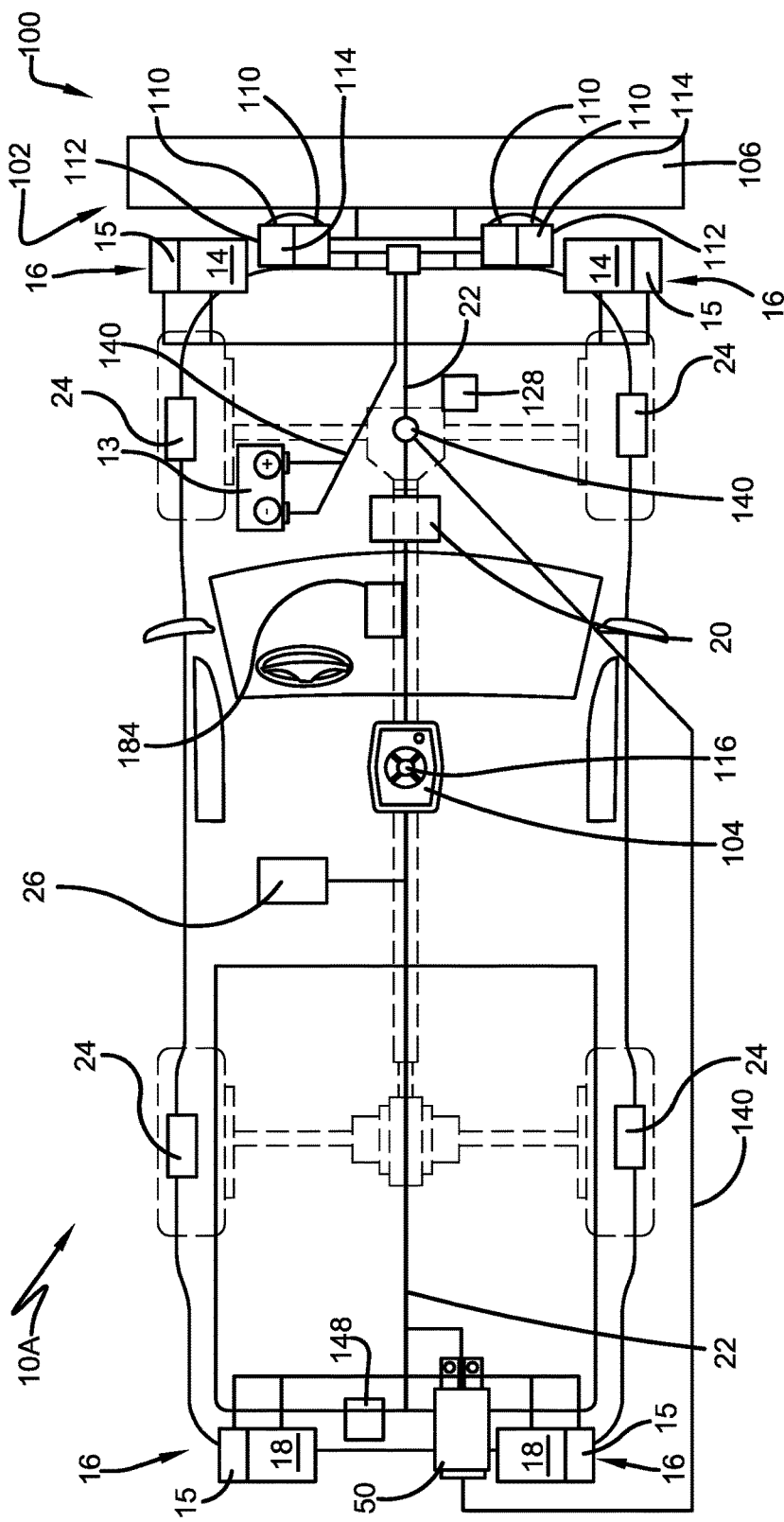
FIG. 6 is a top view of a vehicle in schematic representation according to some aspects of the present teaching.
Figure 7:
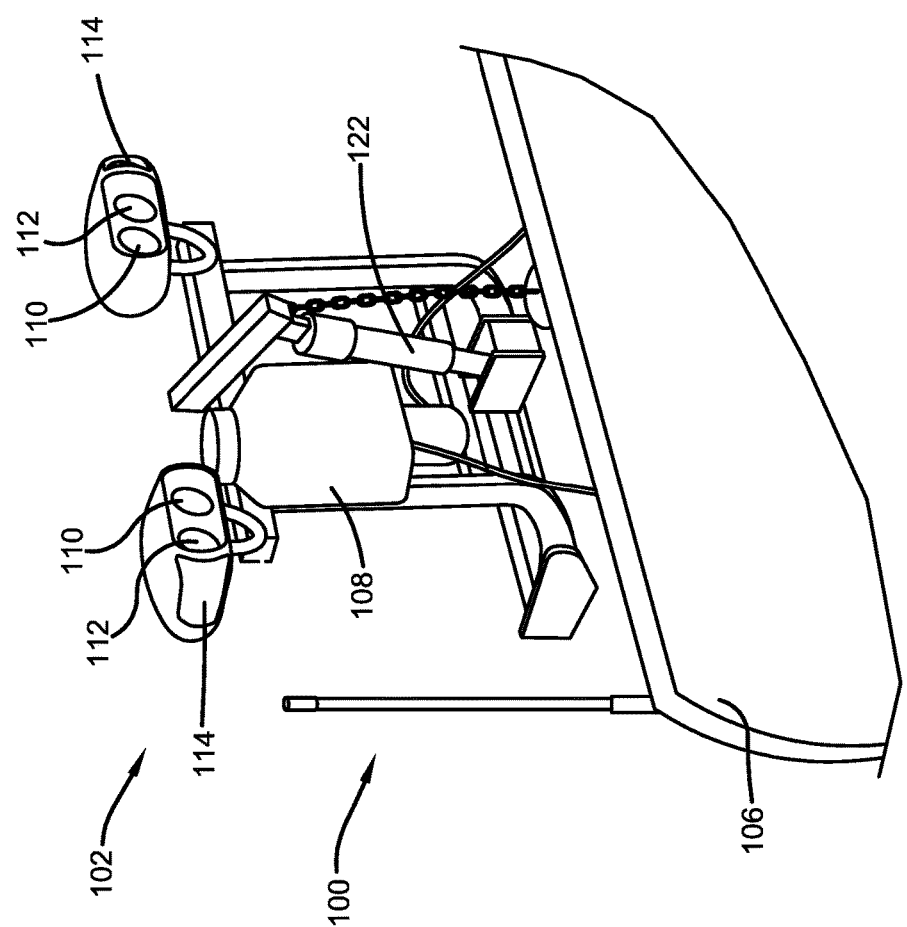
FIG. 7 is a front perspective view of a snowplow implement.

With reference now to FIGS. 5-7, vehicle 10A (or any other vehicle equipped with the appropriate electric plug and chosen by a person of skill in the art) may be equipped with an auxiliary implement 100 and an auxiliary lighting system 102, according to some aspects of the present teaching. The vehicle 10A may have an electronic control unit (ECU) 128 that controls one or more of the electrical system or subsystems in the vehicle 10A in a known manner. As one non-limiting example, the ECU 128 may be used to control a rearview camera 148 which operates in a known manner. The auxiliary implement 100 may be removably mountable to the vehicle 10A and may include an operator adjustable auxiliary implement control 104 that is operable to operate at least one function of the auxiliary implement 100. The particular auxiliary implement, and thus the particular function that is operated, can be any chosen with the sound judgment of a person of skill in the art. According to some aspects of the present teaching, the auxiliary implement may be a snow and/or ice removal implement; such as a snowplow assembly or a spreader assembly. In FIGS. 5-7, the auxiliary implement 100 is a snowplow assembly including a snowplow blade 106 which may be position adjusted using a hydraulic unit 108. The snowplow assembly may further comprise a plow frame 118, a lift frame 120, a lift cylinder 122 and all other parts associated with the snowplow assembly as is well known to those of skill in the art. The operator adjustable auxiliary implement control 104 may be operated, for example, to raise and/or lower and/or laterally position the snowplow blade 106 using the hydraulic unit 108.

Figure 8:
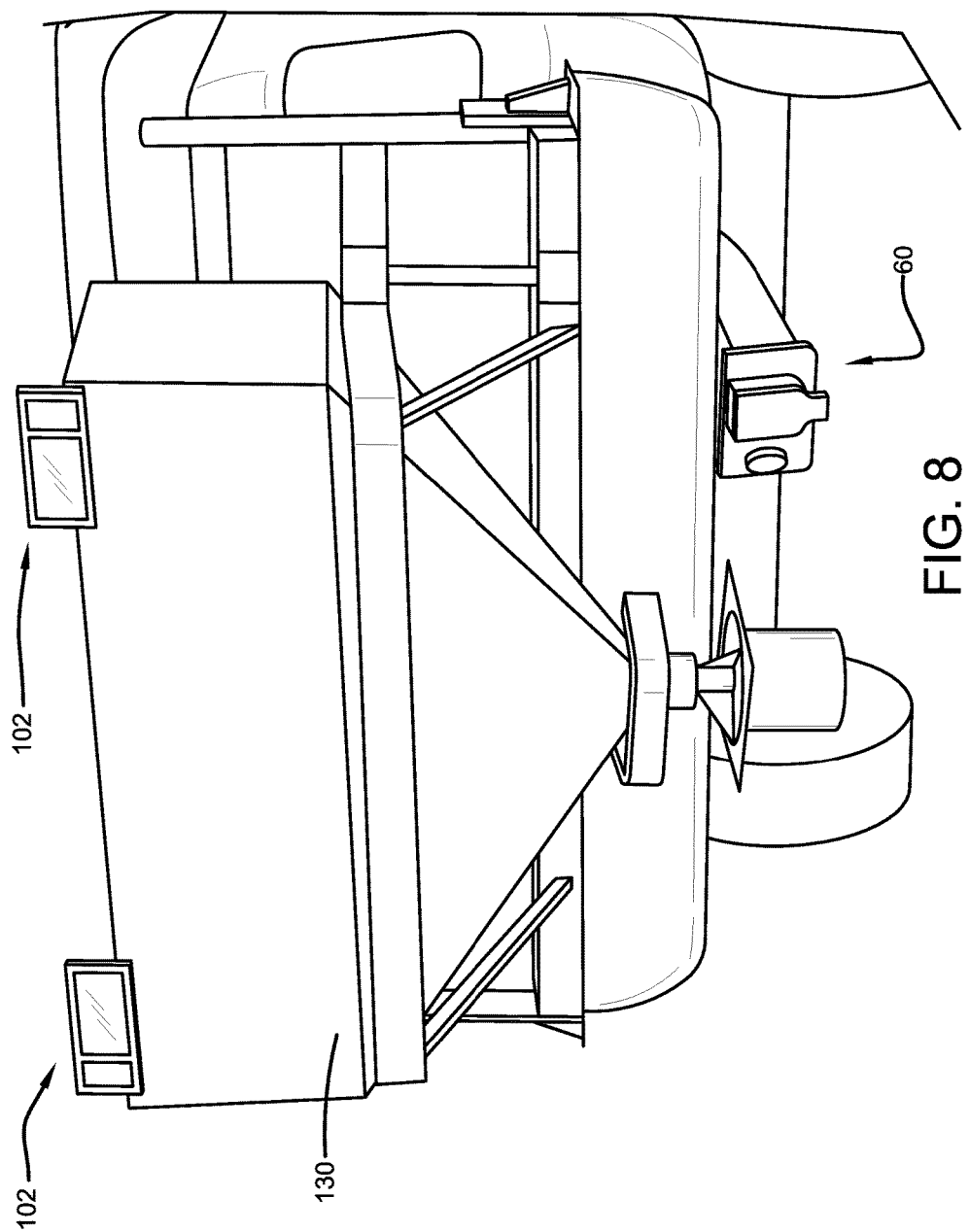
FIG. 8 is a back perspective view of a vehicle with a salt spreader attached thereto.

FIG. 8 shows another snow and/or ice removal implement in the form of a salt spreader 130 that may be mountable to a vehicle and used according to some aspects of the present teaching. The spreader 130 may include an auxiliary lighting system 102 that is operated using an electric signal from a vehicle electric plug 60 as will be discussed further below. Non-limiting examples of other snow and/or ice removal auxiliary implements that may be used with this invention include power brooms, sweepers, and the like. As the operation of auxiliary implements are known to those of skill in the art, further details will not be provided here.

With reference now to FIGS. 5-7, the auxiliary lighting system 102 may be designed for use with the auxiliary implement 100 and may include at least one auxiliary headlight 110 designed to illuminate the ground surface upon which the vehicle travels in place of the vehicle headlight 14 and at least one auxiliary supplemental light 112, such as a turn signal light 114, a park light, or any other supplemental light chosen with the sound judgment of a person of skill in the art. An operator adjustable auxiliary light control 116 may be operable to operate the auxiliary headlight 110 as will be discussed further below.

Figure 9:
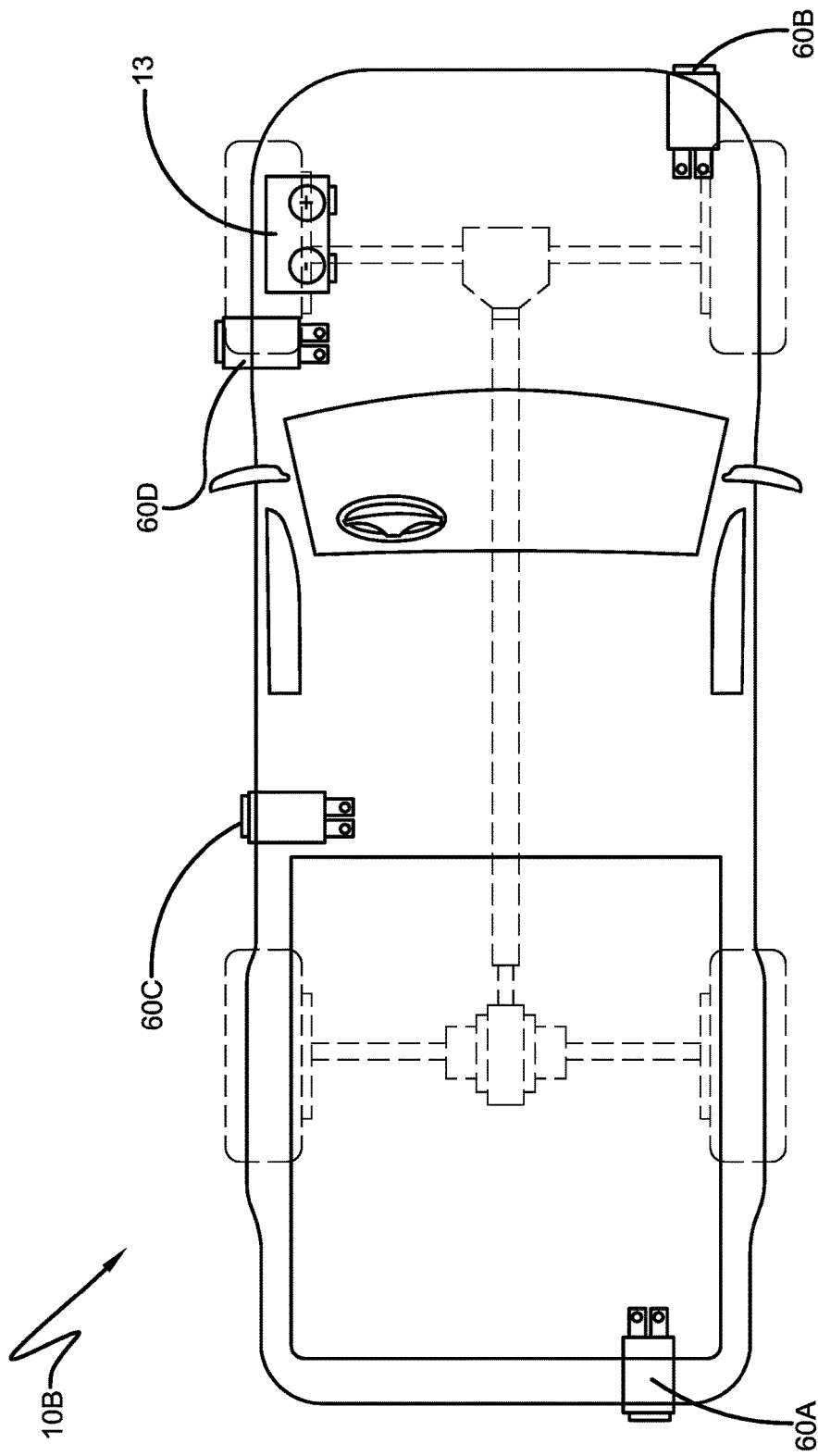
FIG. 9 is a top view of a vehicle in schematic representation according to some aspects of the present teaching.

With reference now to FIGS. 3-6 and 8-9, a trailer plug, as is well known to those of skill in the art, is an electrical connector plug that indicates the condition of one or more of the vehicle supplemental lights 16 and that is positioned at the rear end of the vehicle 10A. An electrical connector is any type of electrical apparatus that enables one or more electrical wires, cables, harnesses, or devices to be electrically connected. An electric plug is an electrical connector that comprises one or more male extensions and/or female sockets that engage with corresponding female sockets and/or male extensions in one or more corresponding electric plugs to complete an electric connection. While this invention is designed to work with a vehicle's trailer plug, it should be noted that this invention will work with any electrical connector, an electric plug or otherwise, that indicates the condition of one or more of the vehicle supplemental lights. FIG. 9 is a schematic representation of a vehicle 10B which may be similar to vehicle 10A described above. Reference 60 again indicates a vehicle electric plug that indicates the condition of one or more of the vehicle supplemental lights and the corresponding letter indicates the various possible locations for the vehicle electric plug 60. Thus, the vehicle electric plug 60 may be positioned at the rear of the vehicle, as is typically known and thus referred to as a "trailer plug," as is shown with reference 60A. Alternatively, or in addition, a vehicle electric plug may be positioned at the front of the vehicle as shown with reference 60B. According to some aspects of the present teaching, a vehicle electric plug may be positioned at the side of the vehicle as shown with reference 60C and/or near a power source 13 as shown with reference 60D. The power source 13 may be any power source chosen with the sound judgment of a person of skill in the art to provide appropriate power used as will be discussed further below. Non-limiting examples of power sources 13 that may be used according to some aspects of the present teaching include a vehicle battery, a fuel cell, an electric motor, a hydraulic motor, a pneumatic motor and an internal combustion engine. It should be understood that the location of the electrical connector, such as an electric plug, when used with this invention can be any location chosen with the sound judgment of a person of skill in the art.

Figure 3:
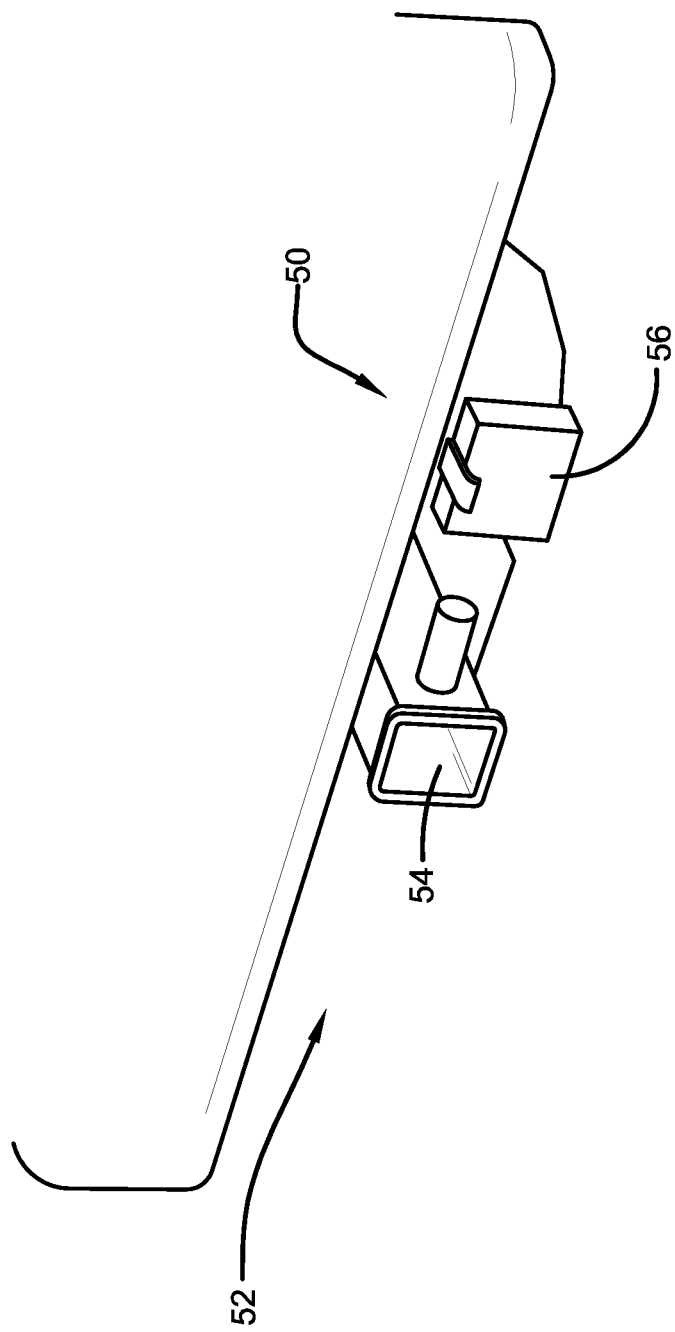
FIG. 3 is a back perspective view of a known vehicle showing the trailer hitch including a trailer plug.
Figure 4:
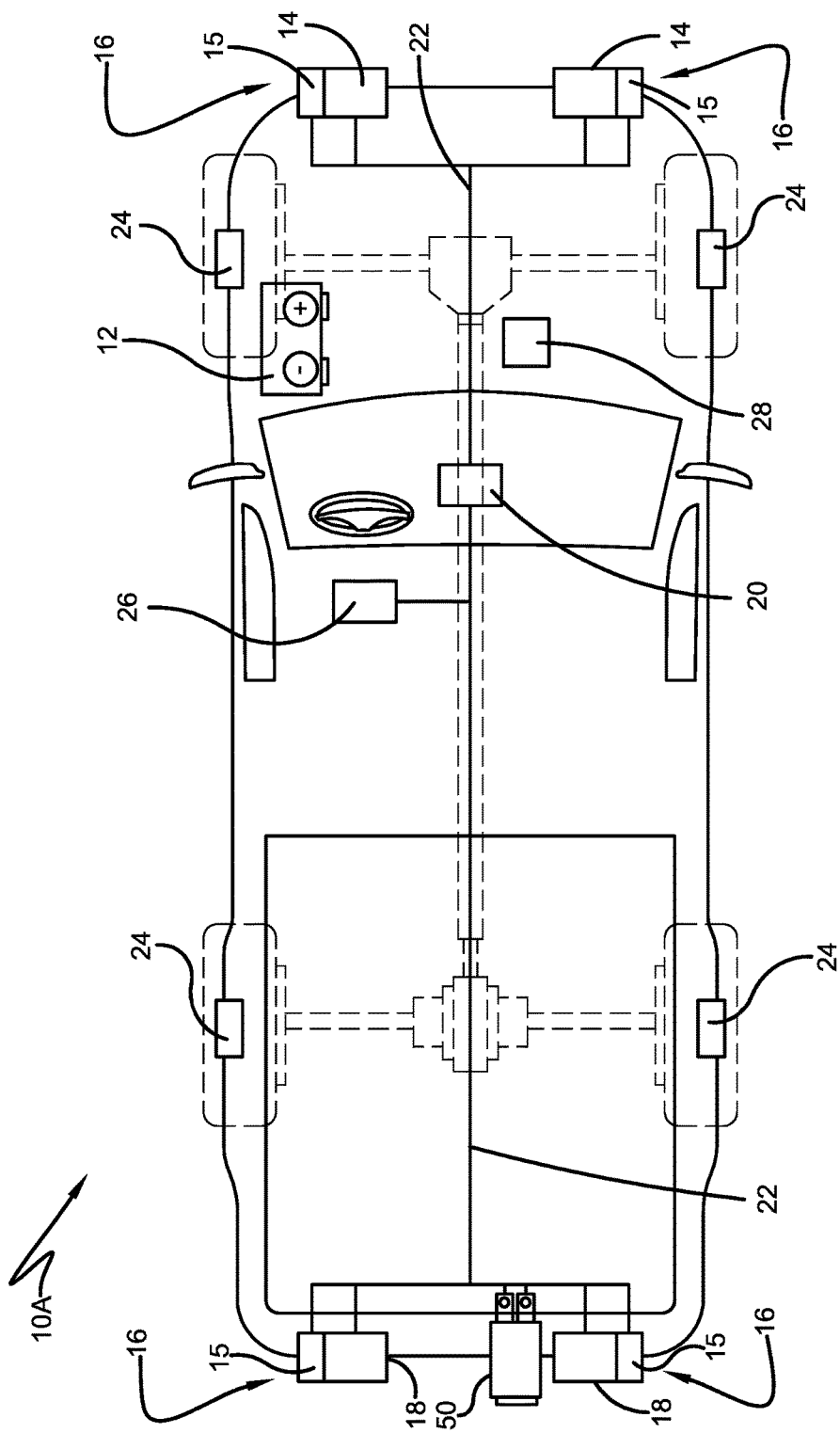
FIG. 4 is a top view of a known vehicle in schematic representation.
Figure 10A:
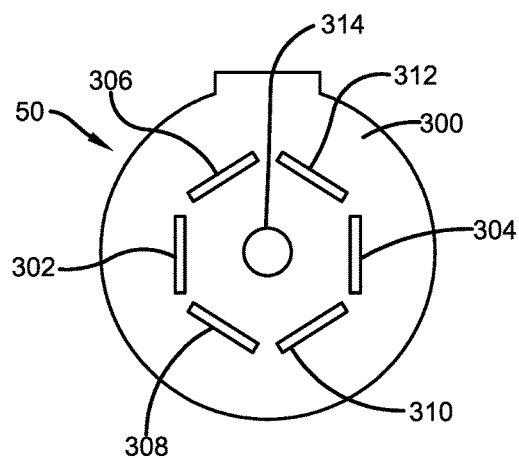
FIG. 10A is a close-up, end view of a 7-way plug.
Figure 10B:
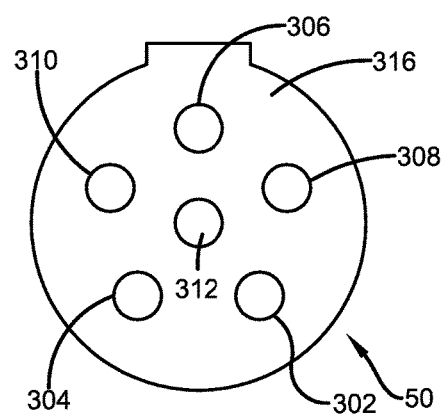
FIG. 10B is a close-up, end view of a 6-way plug.
Figure 10C:
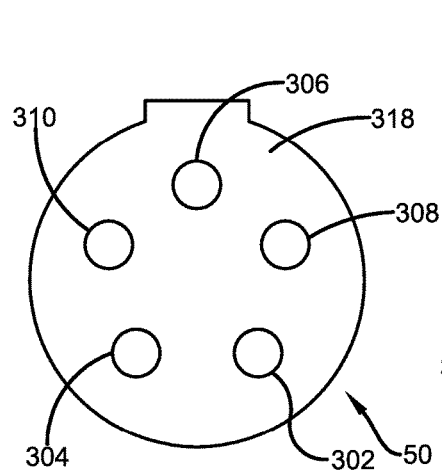
FIG. 10C is a close-up, end view of a 5-way plug.
Figure 10D:
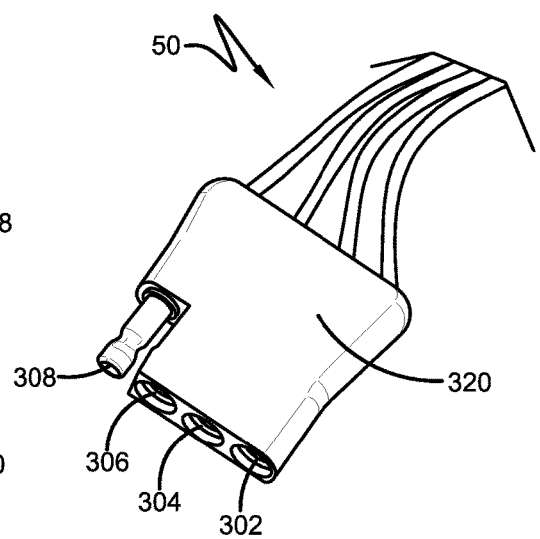
FIG. 10D is a close-up, perspective view of a 4-way plug.

With reference now to FIGS. 10A-10D, as noted above, there are several types of known trailer plugs 50. FIG. 10A illustrates a 7-way trailer plug; FIG. 10B illustrates a 6-way trailer plug; FIG. 10C illustrates a 5-way trailer plug; and, FIG. 10D illustrates a 4-way trailer plug. Each trailer plug 50 may be factory installed on the vehicle or installed by an aftermarket or third party installer, without limitation. The trailer plug 50 may include a lid or cover 56, as shown in FIGS. 3 and 8, but a cover is not required. FIG. 10A illustrates a standard 7-way plug 300 that includes seven electrical connections with each of these connections designed to provide power and/or control over some portion(s) of a trailer (not shown). One known set of connections are: (1) for a left turn signal 302 (also used for braking); (2) for a right turn signal 304 (also used for braking); (3) for tail lights 306 (also for marker lights); (4) a ground wire 308; (5) for trailer power brakes 310; (6) an auxiliary power connection 312; and, (7) for reverse lights 314. FIG. 10B illustrates a 6-way plug 316 with these six connections: (1) for a left turn signal 302 (also used for braking); (2) for a right turn signal 304 (also used for braking); (3) for tail lights 306 (also for marker lights); (4) a ground wire 308; (5) for trailer power brakes 310; and, (6) an auxiliary power connection 312. FIG. 3C illustrates a 5-way plug 318 with these five connections: (1) for a left turn signal 302 (also used for braking); (2) for a right turn signal 304 (also used for braking); (3) for tail lights 306 (also for marker lights); (4) a ground wire 308; and, (5) for trailer power brakes 310. FIG. 3D illustrates a 4-way plug 320 with these four connections: (1) for a left turn signal 302 (also used for braking); (2) for a right turn signal 304 (also used for braking); (3) for tail lights 306 (also for marker lights);

and, (4) a ground wire 308. It should be understood that the trailer plugs 50 just described are exemplary only as many variations are possible. While trailer plugs ordinarily come with hitch receivers, it should be understood that a hitch receiver is not required.

With reference now to FIGS. 5-7, 9, and 11-13, according to some aspects of the present teaching, auxiliary wiring 140 may be used for one or more purposes. The auxiliary wiring 140 may be designed according to some aspects of the present teaching to: (1) electrically connect the power source 13 to: the auxiliary implement 100; and/or the auxiliary lighting system 102; (2) transfer power from the power source 13 to: the auxiliary implement 100; and/or the auxiliary lighting system 102; (3) electrically connect the vehicle electric plug 50, 60 to the auxiliary lighting system 102; and, (4) transmit an electric signal from the vehicle electric plug 50, 60 to the auxiliary lighting system 102. When the auxiliary wiring 140 is properly connected according to some aspects of the present teaching: (1) the operator adjustable auxiliary implement control 104 may be operable to operate at least one function of the auxiliary implement 100; (2) the operator adjustable auxiliary light control 116 may be operable to operate the auxiliary headlights 110; and, (3) the operator adjustable vehicle light control 20 may be operable to operate the auxiliary supplemental lights 112.

Figure 11A:
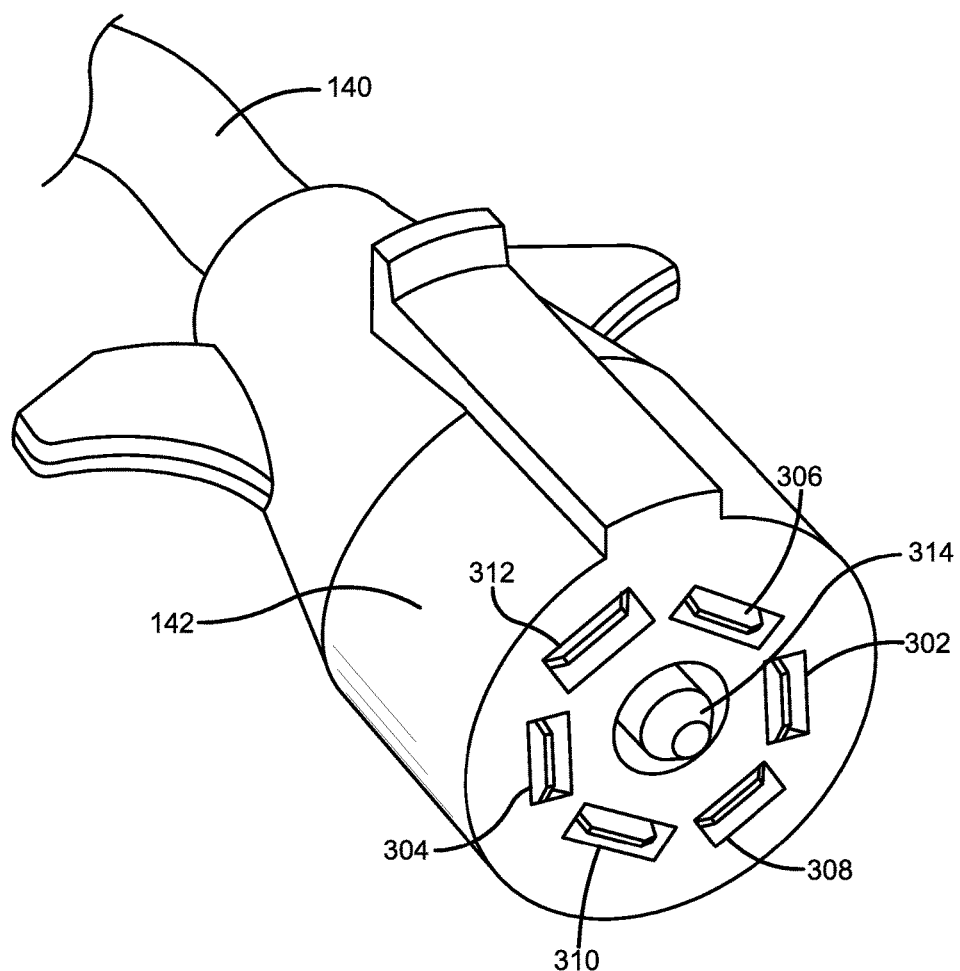
FIG. 11A is a perspective view of an electrical connector plug according to some aspects of the present teaching.
Figure 11B:
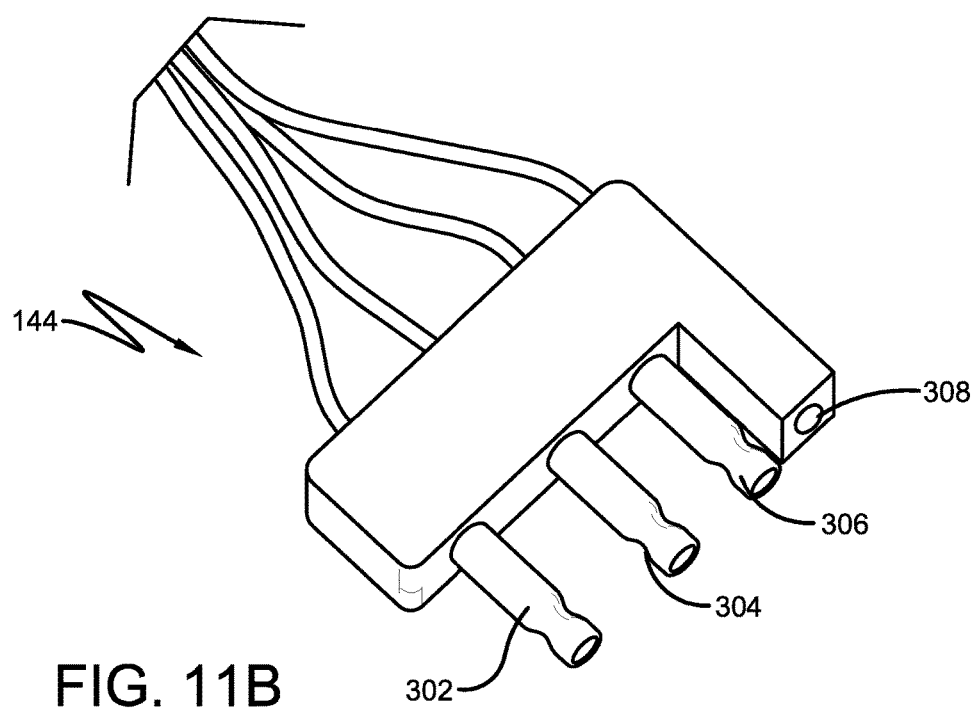
FIG. 11B is a perspective view of an electrical connector plug according to some aspects of the present teaching.

To connect the auxiliary wiring 140 to the vehicle electric plug 60, the auxiliary wiring 140 may have an electrical connector plug that is suitable to electrically connect to (plug into) the particular vehicle electric plug 60. FIG. 11A shows an electrical connector plug 142 that is suitable to plug into the 7-way vehicle electric plug 300 shown in FIG. 10A. The same reference numbers are used in FIG. 11A as in FIG. 10A to indicate the correlating interconnections. Thus, for example, the electrical connector plug 142 connections are: (1) 302 to match or connect to connection 302 of the vehicle plug 300; (2) 304 to match or connect to connection 304 of the vehicle plug 300; (3) 306 to match or connect to connection 306 of the vehicle plug 300; (4) 308 to match or connect to connection 308 of the vehicle plug 300; (5) 310 to match or connect to connection 310 of the vehicle plug 300; (6) 312 to match or connect to connection 312 of the vehicle plug 300; and, (7) 314 to match or connect to connection 314 of the vehicle plug 300. Similarly, according to some aspects of the present teaching, the electrical connector plug can be formed to electrically connect to (plug into): vehicle plug 316 in FIG. 10B; electrical connector plug 318 in FIG. 10C; and, electrical connector plug 320 in FIG. 10D. FIG. 11B, for example, shows an electrical connector plug 144 that is formed to electrically connect to (plug into) vehicle plug 320 shown in FIG. 10D. The electrical connector plug can be formed to electrically connect to (plug into) any vehicle plug chosen with the sound judgment of a person of skill in the art.

Figure 12:
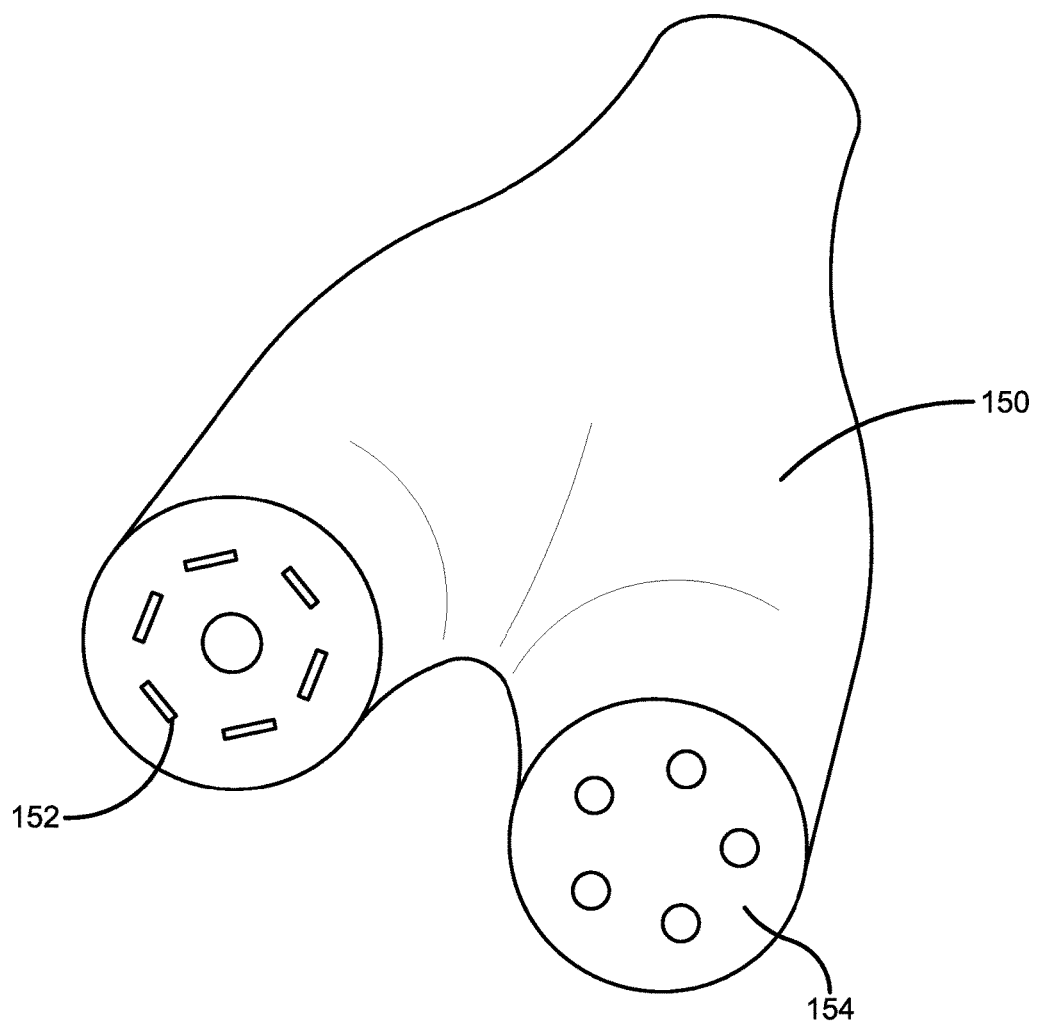
FIG. 12 is perspective view of an adapter according to some aspects of the present teaching.
Figure 13:
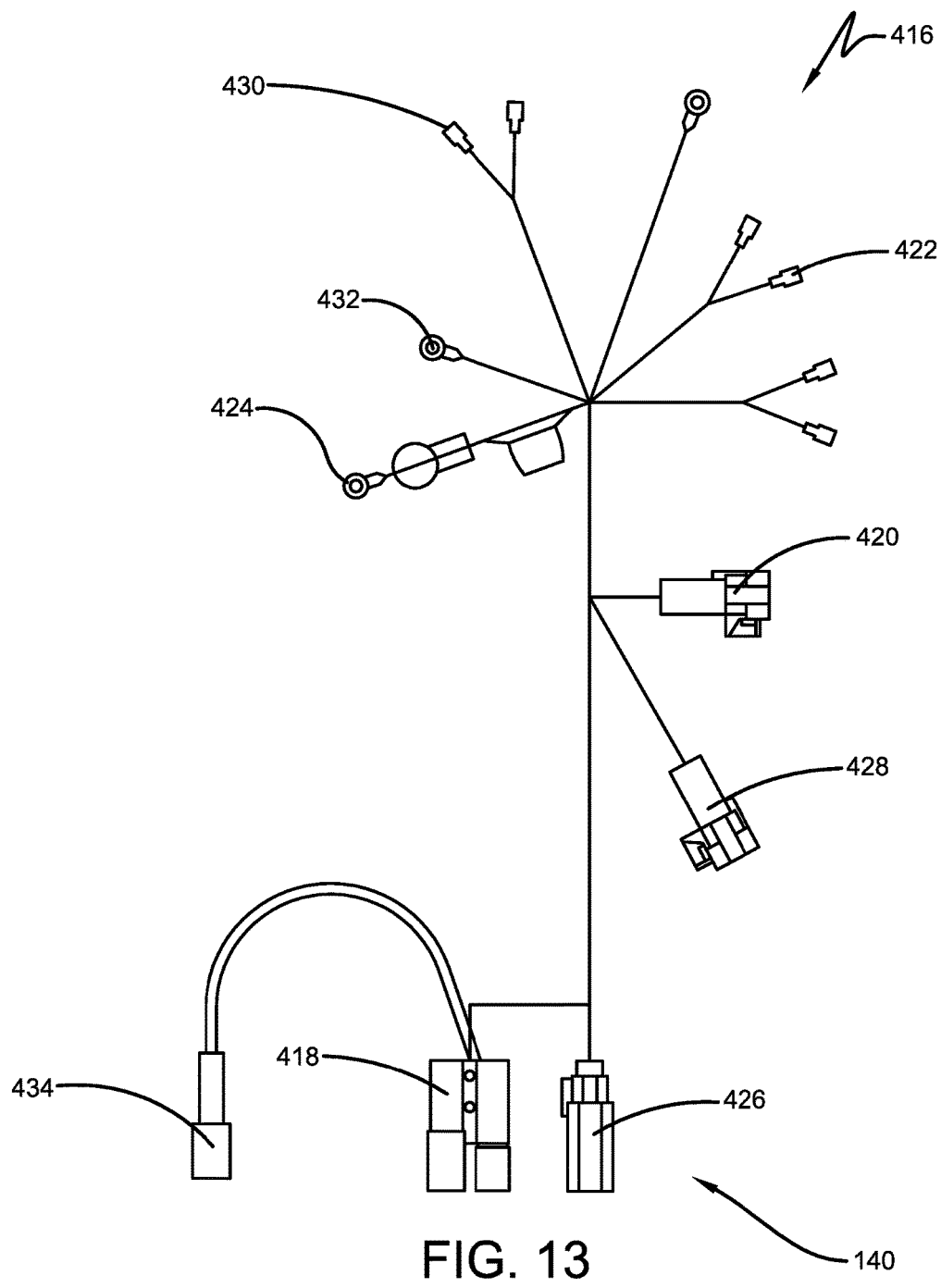
FIG. 13 is a schematic representation of a wiring harness according to some aspects of the present teaching.
Figure 14:
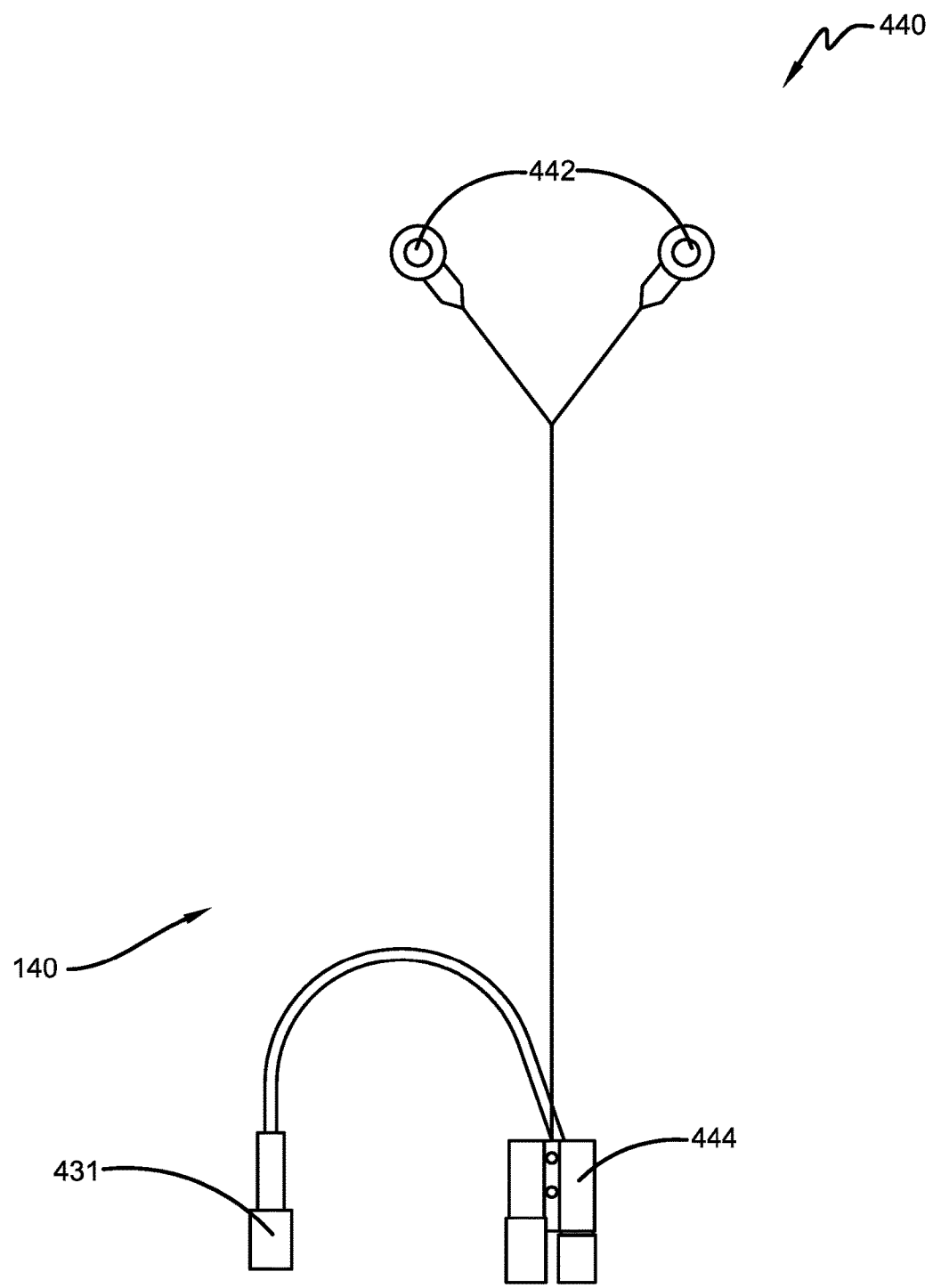
FIG. 14 is a schematic representation of a wiring harness according to some aspects of the present teaching.
Figure 15:
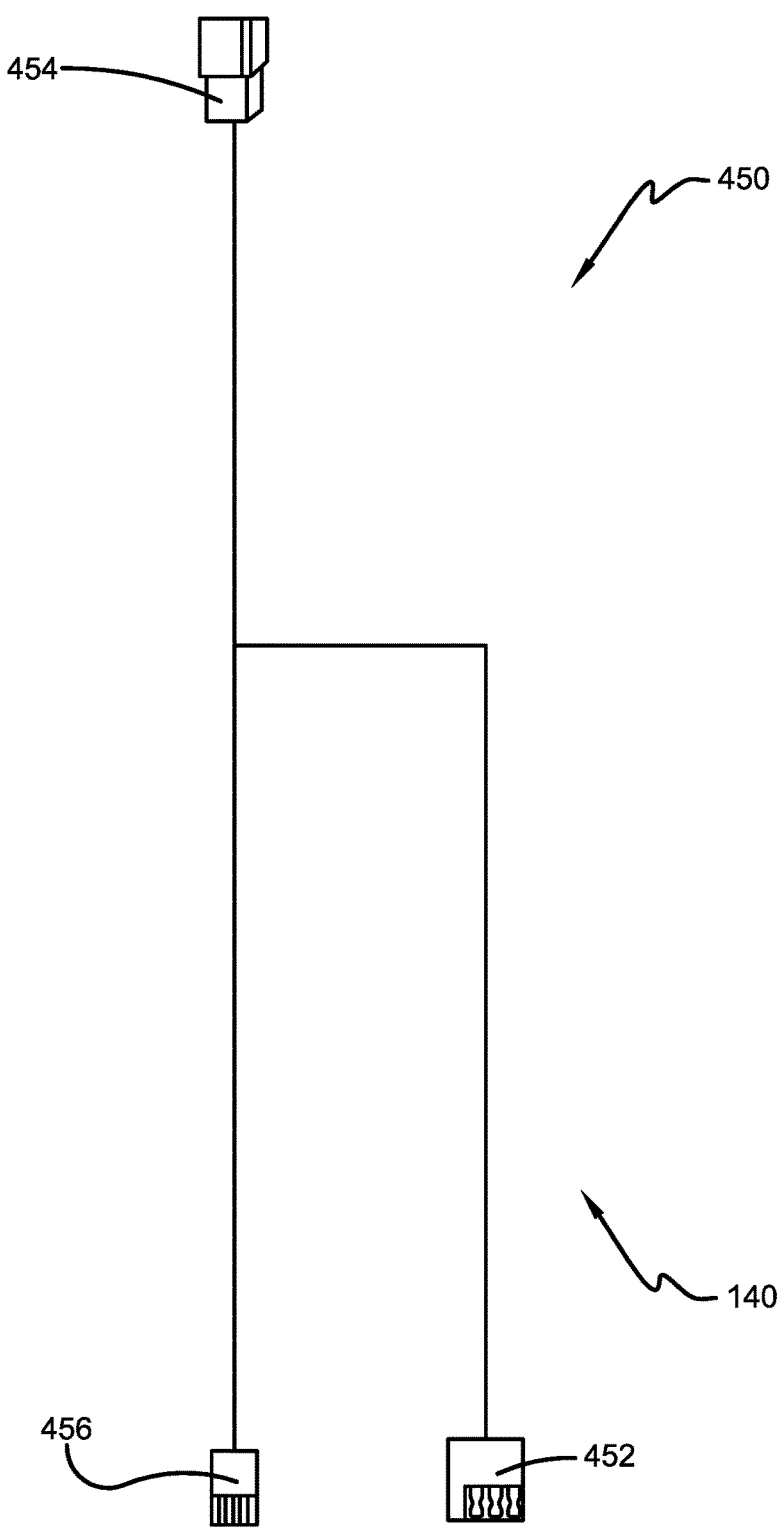
FIG. 15 is a schematic representation of a wiring harness according to some aspects of the present teaching.
Figure 16:
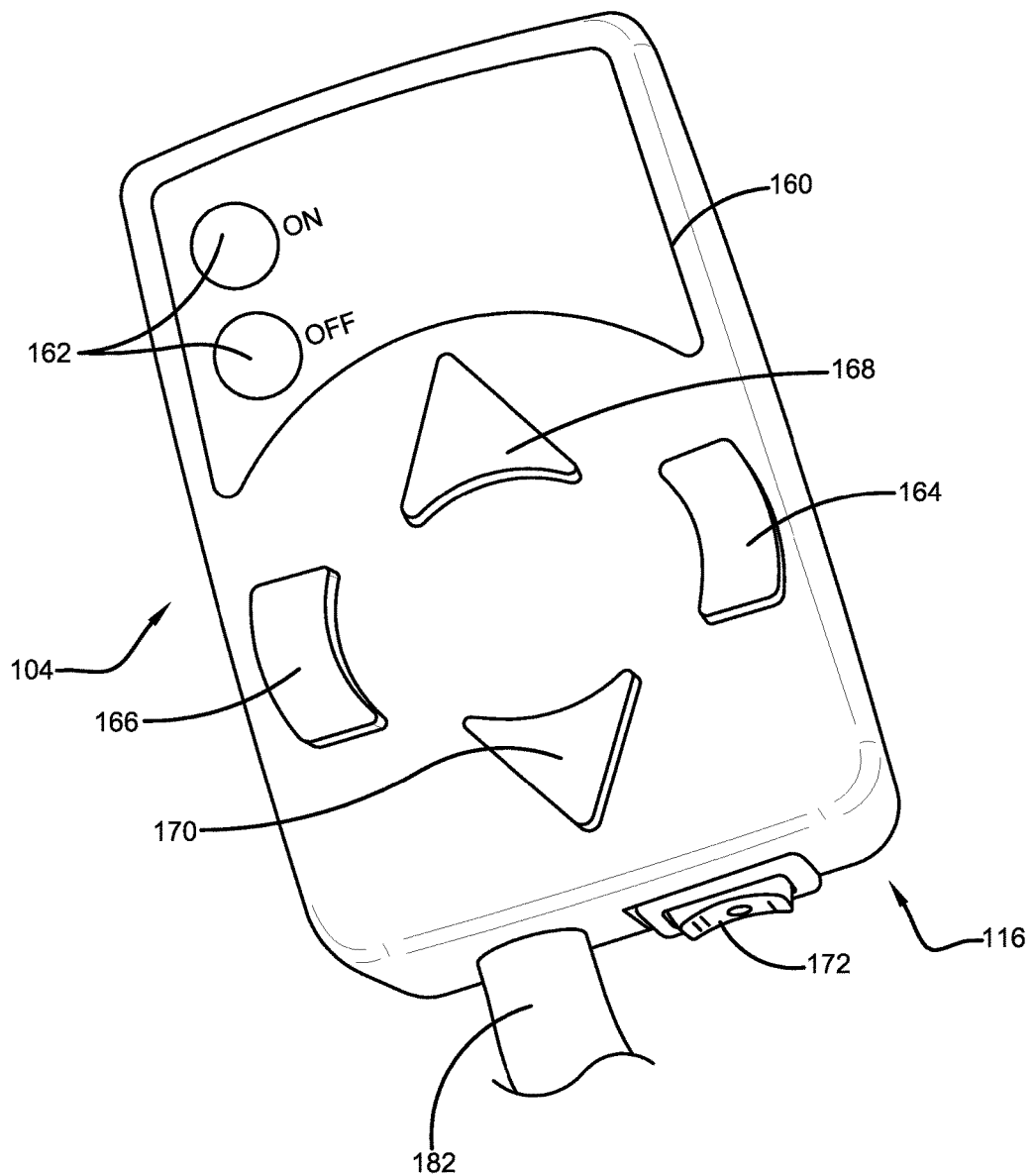
FIG. 16 is a top view of a control housing according to some aspects of the present teaching.
Figure 17:
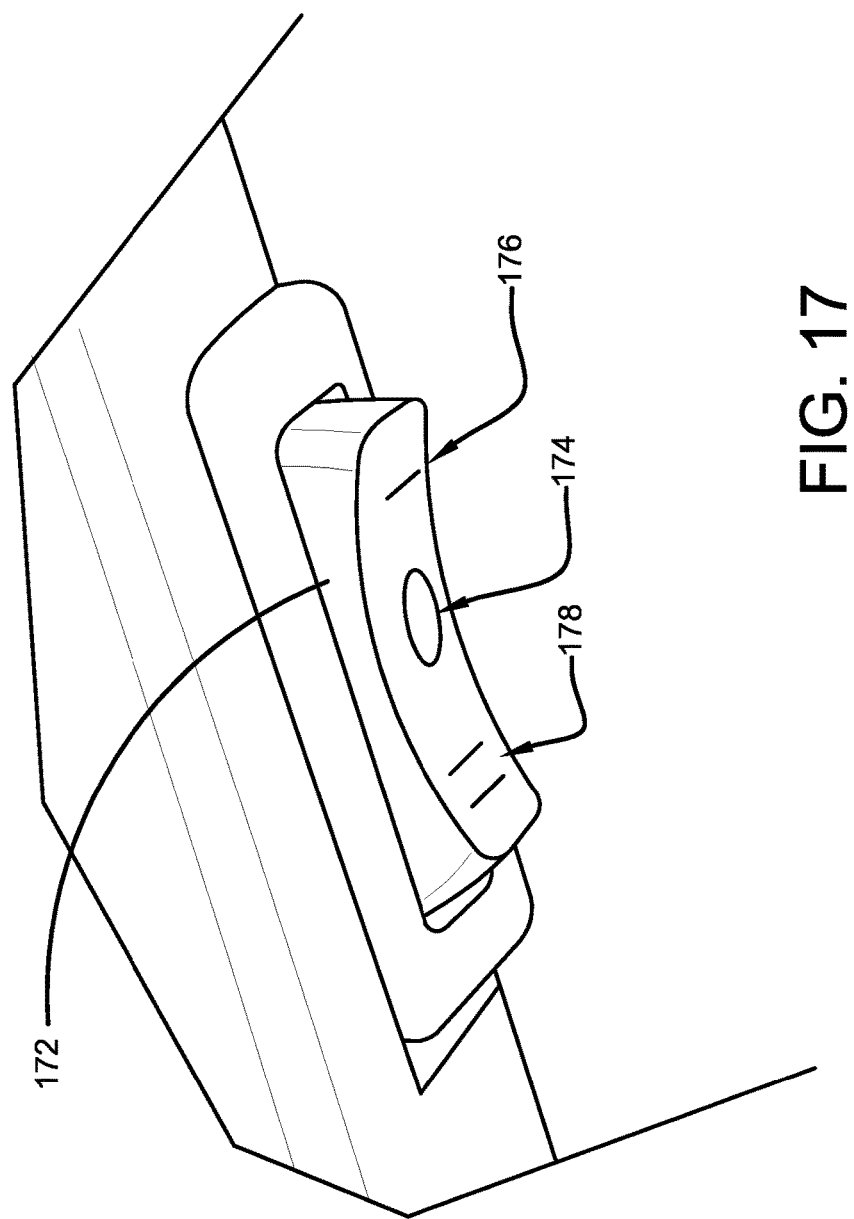
FIG. 17 is a top perspective view of a portion of the controller shown in FIG. 16.
Figure 18:
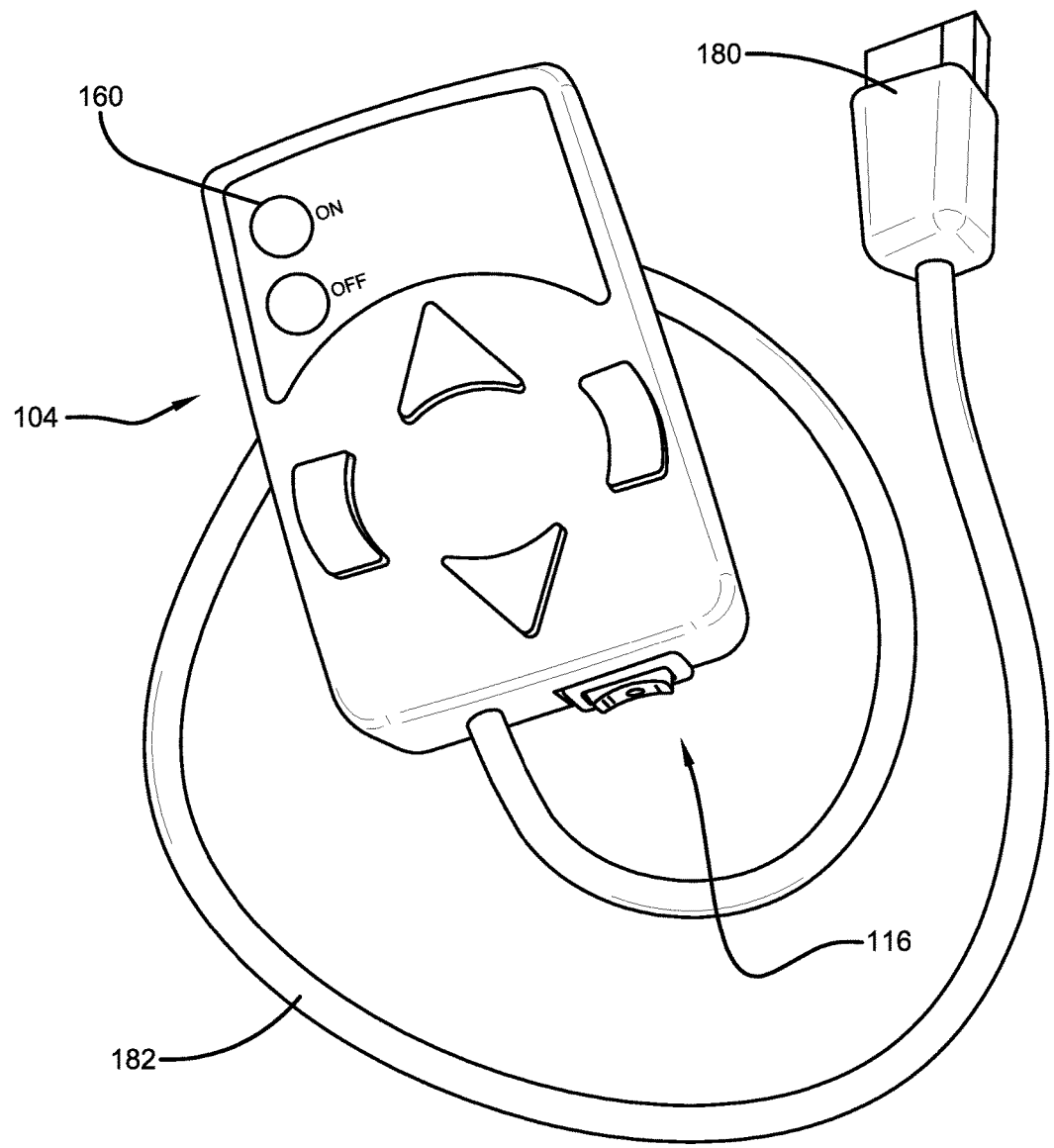
FIG. 18 is a view of the control housing shown in FIG. 16 but also showing an electrical connector.
Figure 19:
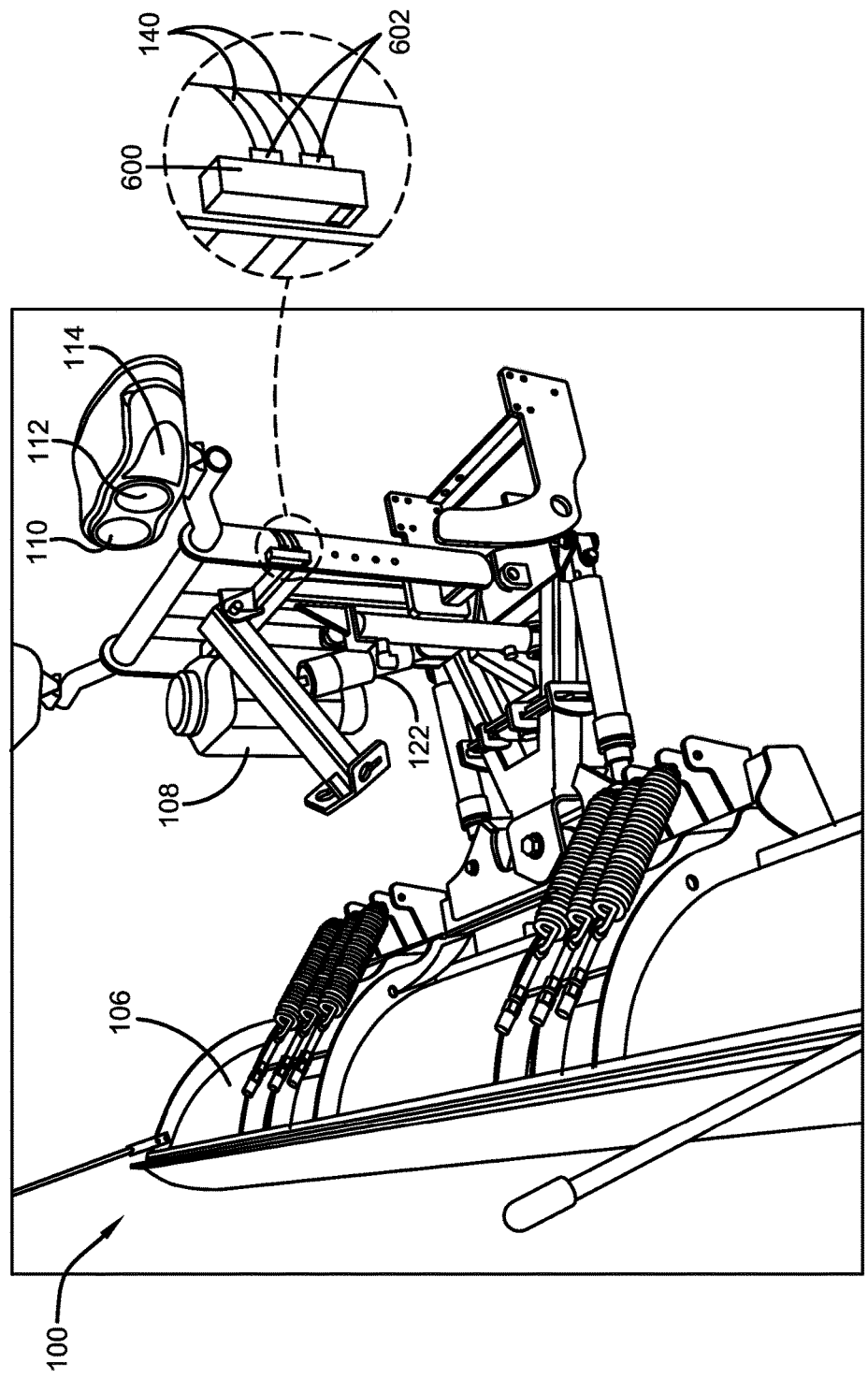
FIG. 19 is a perspective view of a plow frame with a controller.
Figure 20:
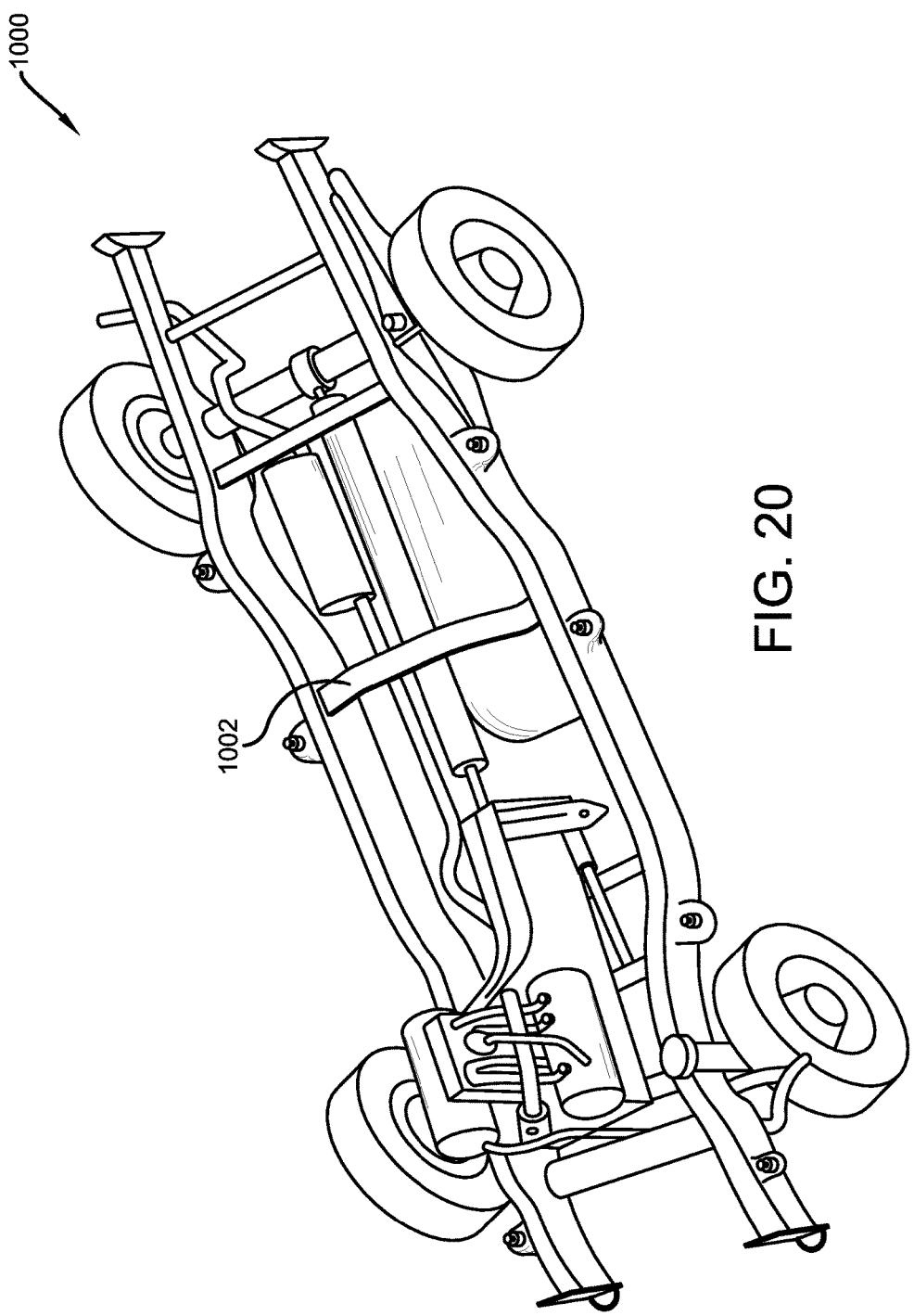
FIG. 20 is a perspective view of a vehicle chassis with the vehicle body removed.
Figure 21:
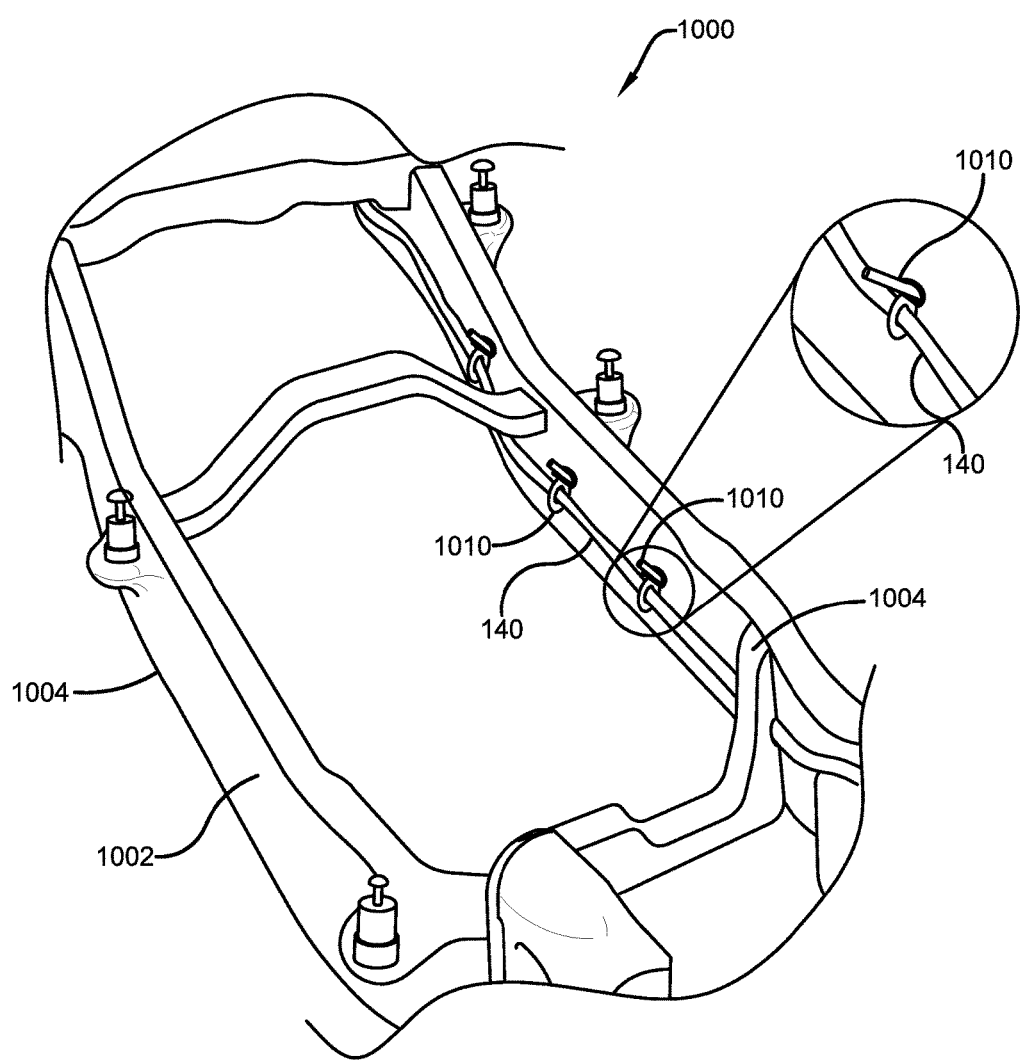
FIG. 21 is a detailed view of a portion of a vehicle chassis.
Figure 22:
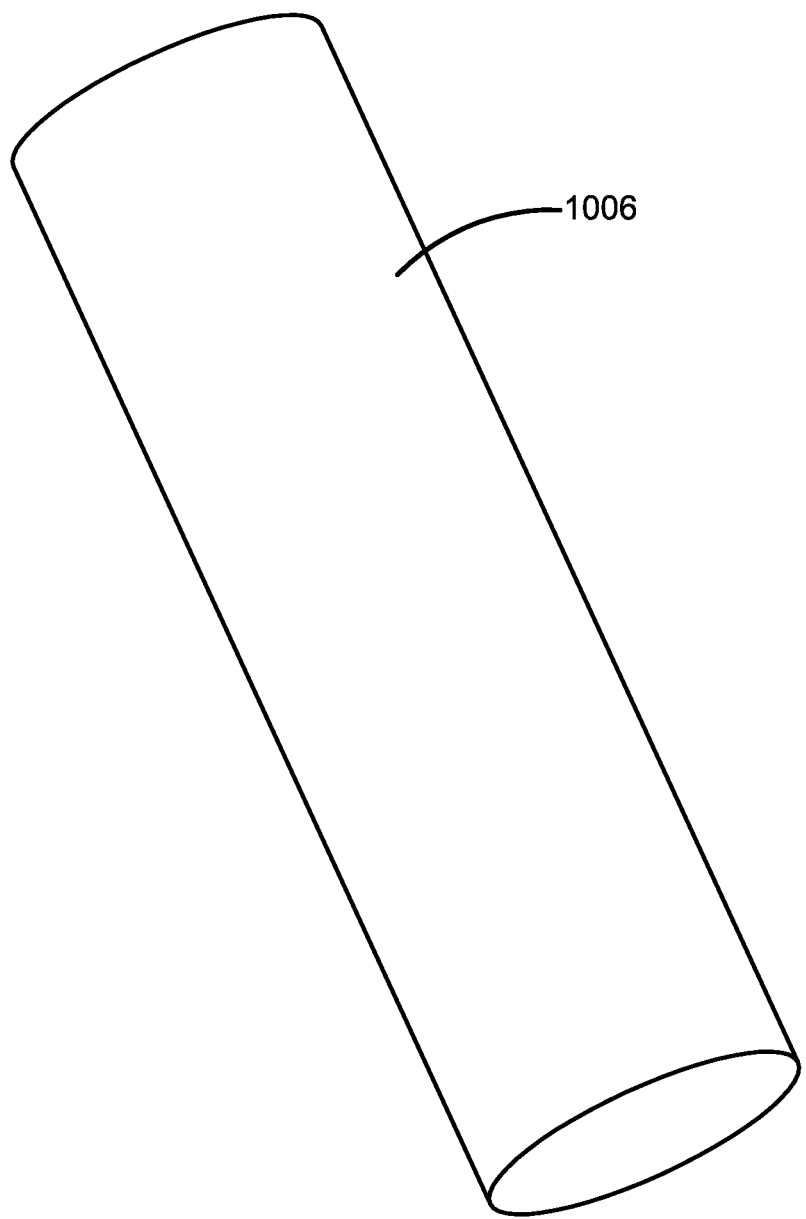
FIG. 22 illustrates a portion of a conduit that may be used to support auxiliary wiring according to some aspects of the present teaching.
Figure 23:
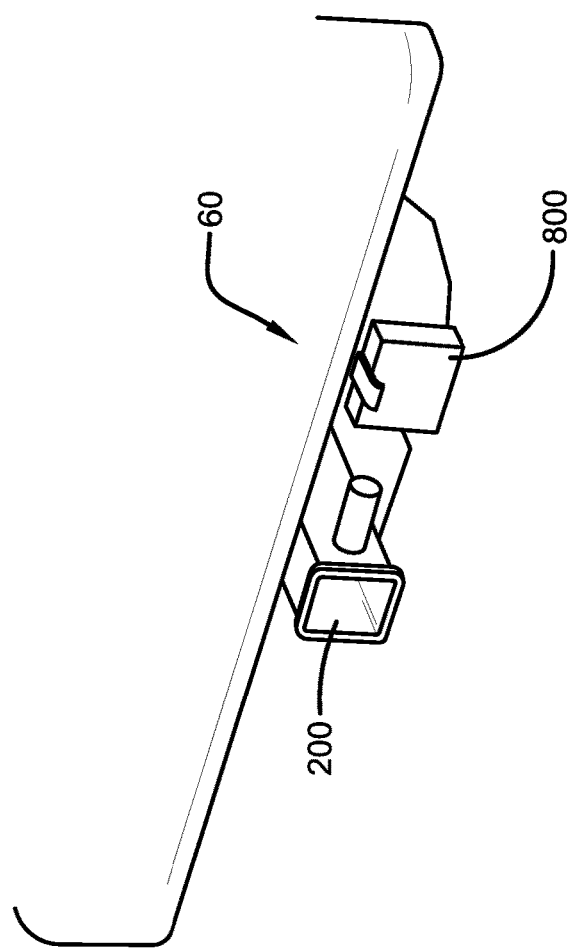
FIG. 23 is a perspective view of the rear of a vehicle, showing a transponder connected to a vehicle electric plug.
Figure 24:
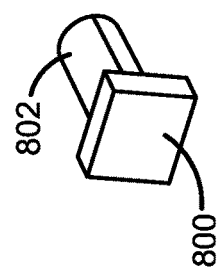
FIG. 24 is a perspective view of a transponder.
Figure 25:
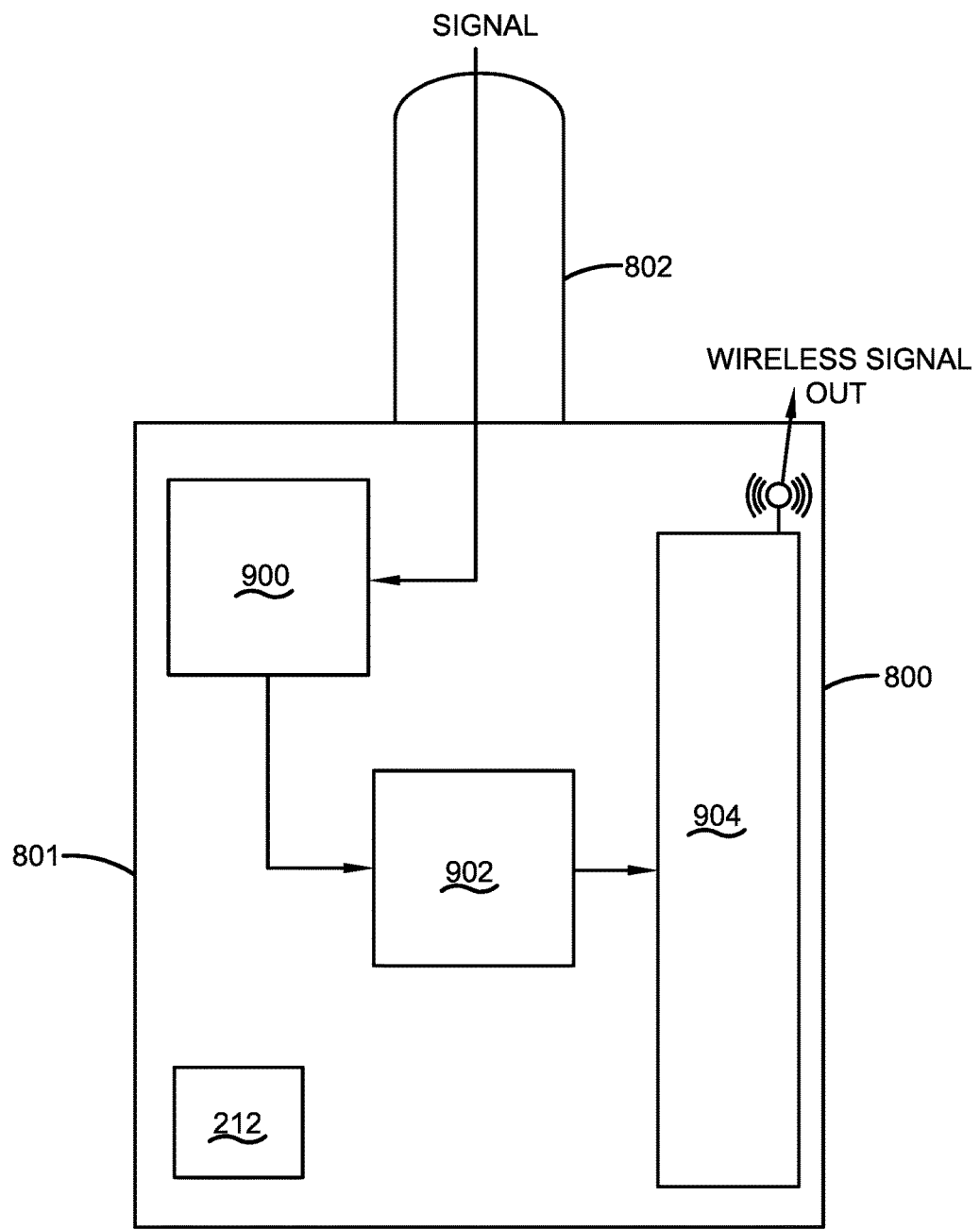
FIG. 25 is a schematic representation of a transponder.
Figure 26:
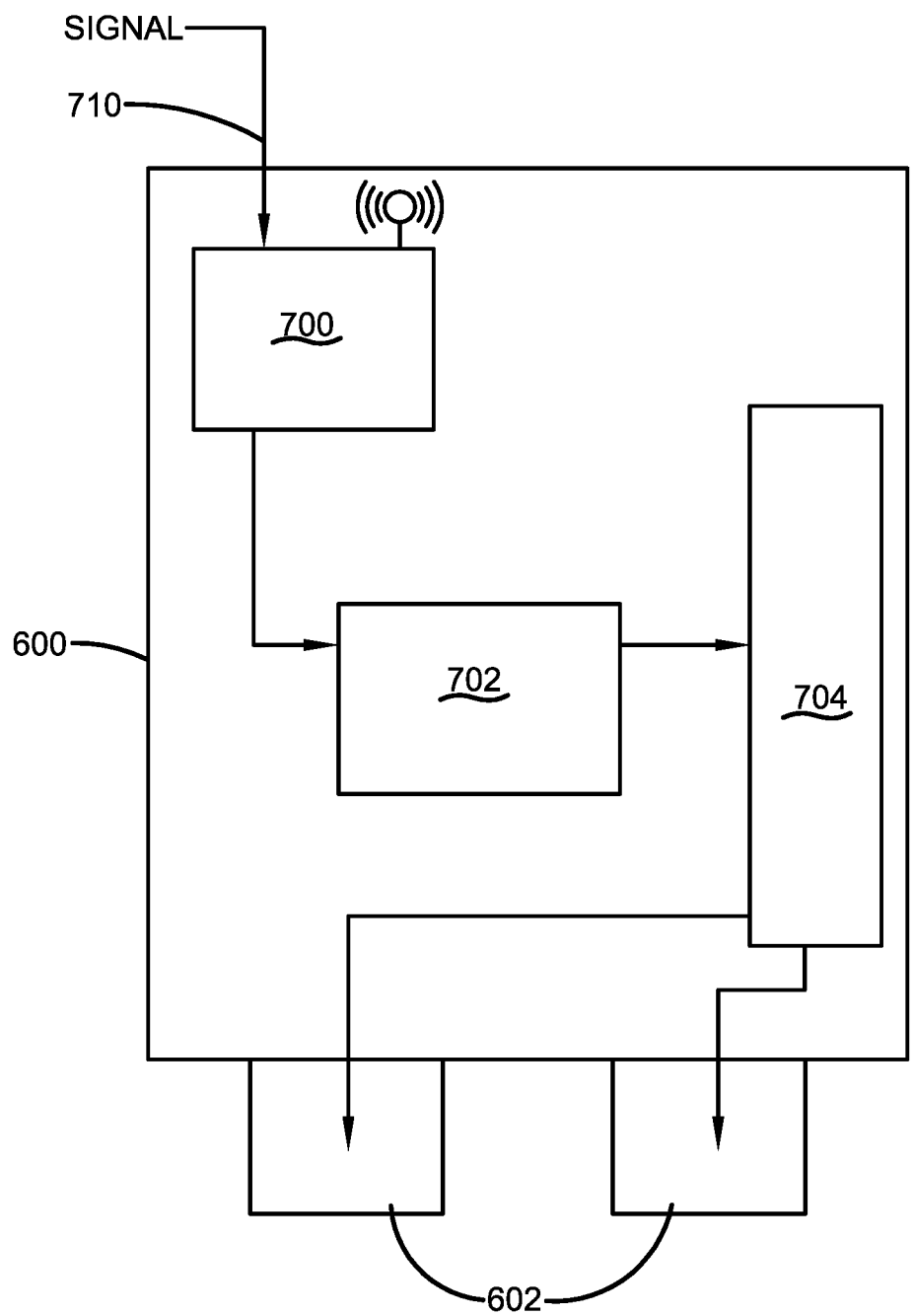
FIG. 26 is a schematic representation of a controller.

With reference to FIG. 12, an adapter 150 can be used between the vehicle electric plug 60 and the auxiliary wiring electrical connector plug. The adapter 150 can split the connections from the vehicle electric plug 60 into a first outlet 152 and a second outlet 154. The first and second outlets 152, 154 can be configured to allow connections for any of the various plug types. By way of a non-limiting example, the first outlet 152 can be a 7-way plug and the second outlet 154 can be a 5-way plug, as shown. The combinations can be chosen by a person of ordinary skill in the art and can be tailored for specific needs given the desired usage. The adapter 150 can allow a person to connect the present invention while leaving an additional connection available for use with a trailer or second implement. According to some aspects of the present teaching, the adapter 150 can have more than two outlets.

With reference now to FIGS. 6, 11A, 11B and 13-15, the auxiliary wiring 140 may include one or more wiring harnesses. According to some aspects of the present teaching, the auxiliary wiring 140 includes three wiring harnesses as will now be described.

With reference now to FIGS. 5-7 and 13, the auxiliary wiring 140 may include a first wiring harness 416. Wiring harness 416 may include: a first electrical connector 418 that may be a power connector; a second electrical connector 420 that may be electrically connectable to at least one auxiliary headlight 110; a third electrical connector 422 that may be electrically connectable to at least one auxiliary supplemental light 112; a fourth electrical connector 424 that is electrically connectable to the auxiliary implement 100; and, a fifth electrical connector 426. It should be noted, however, that additional electrical connectors may also be part of the first wiring harness 416. Thus, for example, the first wiring harness 416 may also include a sixth electrical connector 428 that may be electrically connectable to at least one auxiliary headlight 110 and a seventh electrical connector 430 that may be electrically connectable to at least one auxiliary supplemental light 112. According to some aspects of the present teaching, the first wiring harness 416 includes an electrical connector for each of the auxiliary head lights and each of the auxiliary supplemental lights that must be illuminated. The first wiring harness 416 may also include additional electrical connectors 432 used to connect to various components of the auxiliary implement 100. Any number of electrical connectors chosen with the sound judgment of a person of skill in the art, may be included with the first wiring harness 416. If desired, a connector cap may be secured to the wiring harness 416 near any electrical connector that can use such a cap to protect the electrical connector when not in use. Electrical connector 418, for example, has a connector cap 434.

With reference now to FIGS. 5-7 and 14, the auxiliary wiring 140 may include a second wiring harness 440. Wiring harness 440 may include: a first end that is electrically connectable to the power source 13 (a pair of battery loops 442, one to receive the negative battery terminal and the other to receive the positive battery terminal, may be used for this purpose according to some aspects of the present teaching); and, a second end with a power connector 440. The power connector 440 may be electrically connectable to the power connector 418 of the first wiring harness 416 and may be designed to transmit power from the power source 13 to the power connector 418 of the first wiring harness to power the auxiliary implement 100. The power connector 440 may include an electrical connector cap 431, as shown.

With reference now to FIGS. 5-7, 11A, 11B and 15, the auxiliary wiring 140 may include a third wiring harness 450. Wiring harness 450 may include: a first electrical connector 452 that is electrically connectable to the vehicle electric plug 60 (such as previously described electrical connector plugs 140, 142 shown in FIGS. 11a and 11B, respectively); a second electrical connector 454 that is electrically connectable to the fifth electrical connector 426 of the first wiring harness 416; and, a third electrical connector 456 that is designed to be connected to the operator adjustable auxiliary light control 116 and the operator adjustable auxiliary implement control 104. The third wiring harness 450 may be designed to transmit an electric signal from the vehicle electric plug 60 to the first wiring harness 416.

With reference now to FIGS. 5-9, 13-15 and 18, one or more of the electrical connectors described may, according to some aspects of the present teaching, be electric plugs. According to some aspects of the present teaching, shown, the following electric connectors are electric plugs: the power connector 418 of the first wiring harness 416; the second electrical connector 420 of the first wiring harness 416; the fifth electrical connector 426 of the first wiring harness 416; the sixth electrical connector 428 of the first wiring harness 416; the power connector 444 of the second wiring harness 440; the first electrical connector 452 of the third wiring harness 450; the second electrical connector 454 of the third wiring harness 450; and, the third electrical connector 456 of the third wiring harness 450.

With reference now to FIGS. 5-7 and 16, according to some aspects of the present teaching, not shown, the operator adjustable auxiliary implement control 104 and the operator adjustable auxiliary light control 116 are supported within individual controller housings. According to some aspects of the present teaching, shown in FIGS. 6 and 16, the operator adjustable auxiliary implement control 104 and the operator adjustable auxiliary light control 116 are both supported to a common (the same) hand held controller housing 160. The controller housing(s) may be positioned in any location chosen with the sound judgement of a person of skill in the art. According to some aspects of the present teaching, the controller housing(s) may be maintained within the vehicle so that the vehicle's driver can also operate the controls. The controller housing 160 may have a power ON/OFF switch 162 that is operable to place both the auxiliary headlight(s) 110 and the auxiliary supplemental light(s) 112 into unilluminated conditions when in the power OFF condition. The power ON/OFF switch 162 may also, or alternatively, be operable to turn OFF the operator adjustable auxiliary implement control 104 when in the OFF condition.

With reference now to FIGS. 5-7 and 16, as noted earlier the operator adjustable auxiliary implement control 104 may be operable to operate at least one function of the auxiliary implement 100 chosen with the sound judgment of a person of skill in the art. According to some aspects of the present teaching, the auxiliary implement 100 is a snowplow assembly, such as that shown in FIG. 7, and the operator adjustable auxiliary implement control 104 may have the capability to operate four functions related to the snowplow blade 106: a control button 164 that can be used to cause the snowplow blade 106 to angle toward the right; a control button 166 that can be used to cause the snowplow blade 106 to angle toward the left; a control button 168 that can be used to cause the snowplow blade 106 to be raised (such as to raise above the ground surface being plowed); and, a control button 170 that can be used to cause the snowplow blade 106 to be lowered (such as to lower onto the ground surface being plowed). As these operations are well known to those of skill in the art, further details will not be provided here.

With reference now to FIGS. 5-7 and 16-17, the operator adjustable auxiliary light control 116 may be operable to operate the auxiliary headlights 110 in any manner chosen with the sound judgment of a person of skill in the art. According to some aspects of the present teaching, the operator adjustable auxiliary light control 116 may comprise a control button 172 that is adjustable by the operator into three conditions: auxiliary headlights 110 powered OFF by pressing on portion 174 of the button 172; auxiliary headlights 110 in low beam condition by pressing on portion 176 of the button 172; and, auxiliary headlights 110 in high beam condition by pressing on portion 178 of the button 172. As these operations are well known to those of skill in the art, further details will not be provided here.

With reference now to FIGS. 6, 15-16 and 18, as noted earlier the auxiliary wiring 140 may connect to the operator adjustable auxiliary implement control 104 and to the operator adjustable auxiliary light control 116. This connection can be of any form chosen with the sound judgment of a person of skill in the art. According to some aspects of the present teaching, the third wiring harness 450 has a third electrical connector 456 that is designed to be connected to the operator adjustable auxiliary implement control 104 and to the operator adjustable auxiliary light control 116. According to some aspects of the present teaching, the third electrical connector 456 connects directly to the controller housing 160. In other aspects of the present teaching, the third electrical connector 456 electrically connects to a controller electrical connector 180 which is hardwired 182 to the controller housing 160.

With reference now to FIGS. 5-7 and 19, as noted earlier the auxiliary wiring 140 may electrically connect to the auxiliary lighting system 102. According to some aspects of the present teaching this electrical connection is made by electrically connecting to (plugging into) a controller 600 which, according to some aspects of the present teaching, may include a microprocessor. Alternatively, this electrical connection may be made by connection to another component(s) that connect to the controller 600. According to some aspects of the present teaching, a controller is not required in the connection is made directly to the auxiliary lighting system 102. The operation of the controller 600 will be discussed further below. According to some aspects of the present teaching, the controller 600 may have one or more ports 602 to which the auxiliary wiring 140 connects.

With reference now to FIGS. 5-7, 13-15 and 20-22, the auxiliary wiring 140, whether in the form of the three wiring harnesses 416, 440 and 450 discussed above or otherwise, may be secured to the auxiliary implement 100, and/or the auxiliary lighting system 100, and/or the vehicle, or any some combination in any manner chosen with the sound judgment of a person of skill in the art. According to some aspects of the present teaching, at least a portion of the auxiliary wiring 140 is secured under the chassis 1000 of the vehicle and runs from the vehicle electric plug 60 to the auxiliary lighting system 102. If the vehicle electric plug 60 is a trailer plug (and thus positioned at the rear of the vehicle) then at least a portion of the auxiliary wiring 140 may run lengthwise from the rear of the vehicle to the auxiliary lighting system 102. According to some aspects of the present teaching, the at least a portion of the auxiliary wiring 140 can terminate at the front of the vehicle whereby a second connection could be made with the auxiliary lighting system 102. According to some aspects of the present teaching, the auxiliary wiring 140 can be secured to the chassis 1000, such as to the vehicle's frame rail 1004, using zip-ties 1010, twist ties, wires, or any other fastener chosen by the sound judgment of a person of ordinary skill in the art. The auxiliary wiring 140 may be shielded wire such as the hex-wire typically used for electronics. According to some aspects of the present teaching, some or all of the auxiliary wiring 140 can be routed through a conduit, such as conduit 1006 shown in FIG. 22. The conduit 1006 can be mounted to the chassis 1000, such as to the vehicle's frame rail 1004, using zip-ties 1010, automotive grade tape, or other fasteners. The conduit 1006 could be formed of any material chosen with the sound judgment of a person of skill in the art, such as polyvinyl chloride (PVC). According to some aspects of the present teaching, the auxiliary wiring 140, whether in a conduit or otherwise, can be routed through the interior of the vehicle's frame 1002. According to some aspects of the present teaching, the auxiliary wiring 140 can be aligned to the driver side or passenger side of the vehicle. According to some aspects of the present teaching, the wiring is on the same side of the vehicle as the vehicle battery.

With reference now to FIG. 6, according to some aspects of the present teaching, a sensor 184 may be operable to turn off the auxiliary headlight(s) 110 and/or the auxiliary supplemental light(s) 112 when the vehicle lights are turned off. The operation of sensor 184 may be in any manner chosen with the sound judgment of a person of skill in the art. According to some aspects of the present teaching, the sensor 184 works with a microprocessor described elsewhere in this patent. According to some aspects of the present teaching, the sensor 184 works with a relay in a known manner.

With reference now to FIGS. 5-7, 13-15, 19 and 26, according to some aspects of the present teaching the wiring harnesses 416, 440, 450 may be used as follows after the auxiliary implement 100 has been mounted to the vehicle and the auxiliary lighting system 102 has been mounted to the vehicle and/or to the implement 100. The wiring harnesses 416, 440, 450 may be secured as discussed above. The second electrical connector 420 of the first wiring harness 416 may be electrically connected to the auxiliary light(s) 104 (either directly or via a microprocessor). If the second electrical connector 420 is an electric plug, then it may plug into the auxiliary light(s). The third electrical connector 422 of the first wiring harness 416 may be electrically connected to the auxiliary implement 100. The first end of the second wiring harness 436 (using, according to some aspects of the present teaching, battery loops 438) may be electrically connected to the vehicle battery 12. The power connector 444 of the second wiring harness 440 may be electrically connected to the power connector 418 of the first wiring harness 416 to enable power to be transmitted from the vehicle battery 414 to the auxiliary snow and/or ice removal implement 100. If the power connectors 444, 418 are both electric plugs, then power connector 444 may be plugged into power connector 418 to establish the electrical connection.

With reference now to FIGS. 5-7, 13-15, and 19, the first electrical connector 452 of the third wiring harness 450 may be electrically connected to the vehicle electric plug 60 to enable an electric signal to be transmitted from the vehicle electric plug 60 to the first wiring harness 416. If the first electrical connector 452 is an electric plug, the electrical connector 452 may be plugged into the vehicle electric plug 60 to establish the electrical connection. The position of the vehicle electric plug 60 on the vehicle will determine the required length for the third wiring harness 450. The second electrical connector 454 of the third wiring harness 450 may be electrically connected to the fifth electrical connector 426 of the first wiring harness 416. If the electrical connectors 454, 426 are both electric plugs, then electrical connector 454 may be plugged into electrical connector 426 to establish the electrical connection. Once the wiring harnesses 416, 440 and 450 are properly connected, the operator adjustable auxiliary implement control 104 may be operable to operate at least one function of the auxiliary implement 100; the operator adjustable auxiliary light control 116 may be operable to operate the auxiliary light(s) 104; and, the operator adjustable vehicle light control 20 may be operable to operate the auxiliary headlight(s) 110. One or more of the controls 104, 116, 20 may be manually operable according to some aspects of the present teaching.

Figure 1:
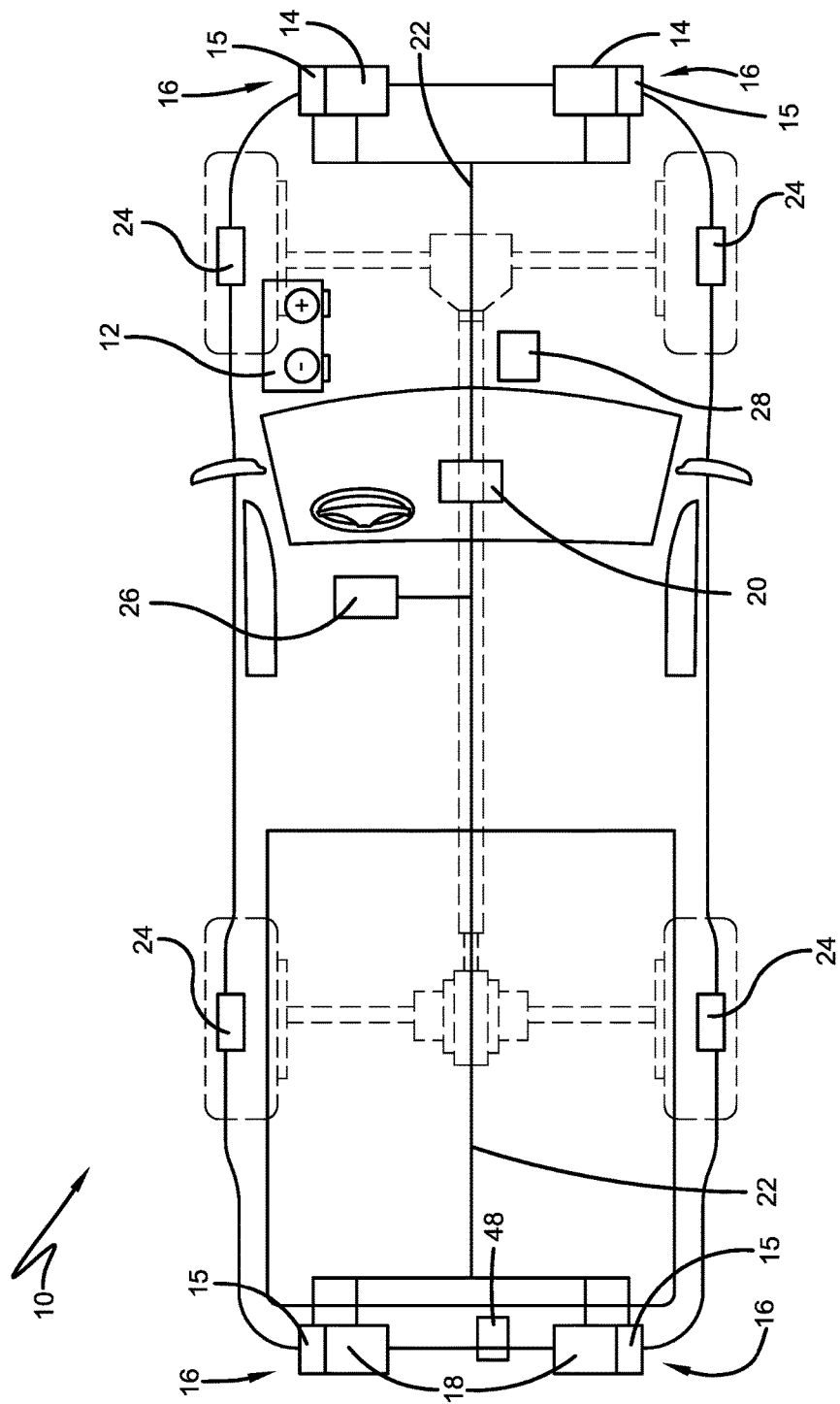
FIG. 1 is a top view of a known vehicle in schematic representation.
Figure 2:
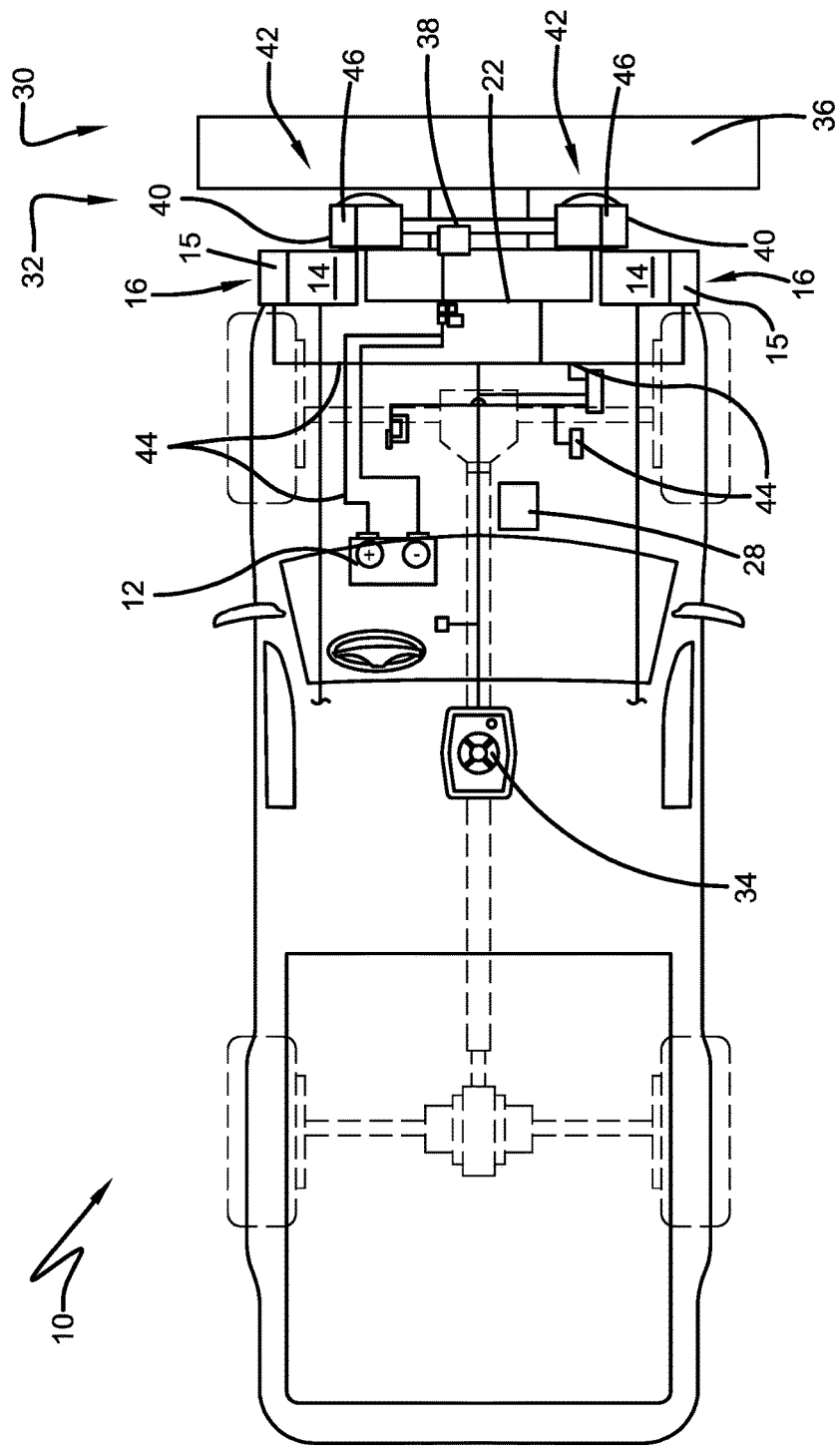
FIG. 2 is a top view of a known vehicle in schematic representation showing the complexity of known wiring systems required to install a snowplow.

There are numerous advantages of using such "hard-wired" devices and methods as compared to wireless devices and methods (discussed further below). These advantages include the lack of electrical interference and the lack of control delays both of which are often found in wireless systems. Another advantage is that all the steps are safely accomplished without the aid of an electrical technician. This is because no splicing or cutting of any wiring is required. Thus, none of the vehicle's electrical system, in function or in structure, is altered in any way. Thus, for example, with reference to FIGS. 1-2 and 6, the vehicle headlights 14 do not have to be detached and the auxiliary wiring 140 is not electrically connected to the vehicle light wiring 22, Also, there is no required reset or adjustments to the vehicle's computer. Another advantage, is that the various electrical plugs provide for easy "plug-and-play" connections. Thus, the time required to install this invention is greatly reduced over known systems. FIG. 6, especially when compared with FIG. 2, shows how greatly simplified the use of this invention is.

Figure 27:
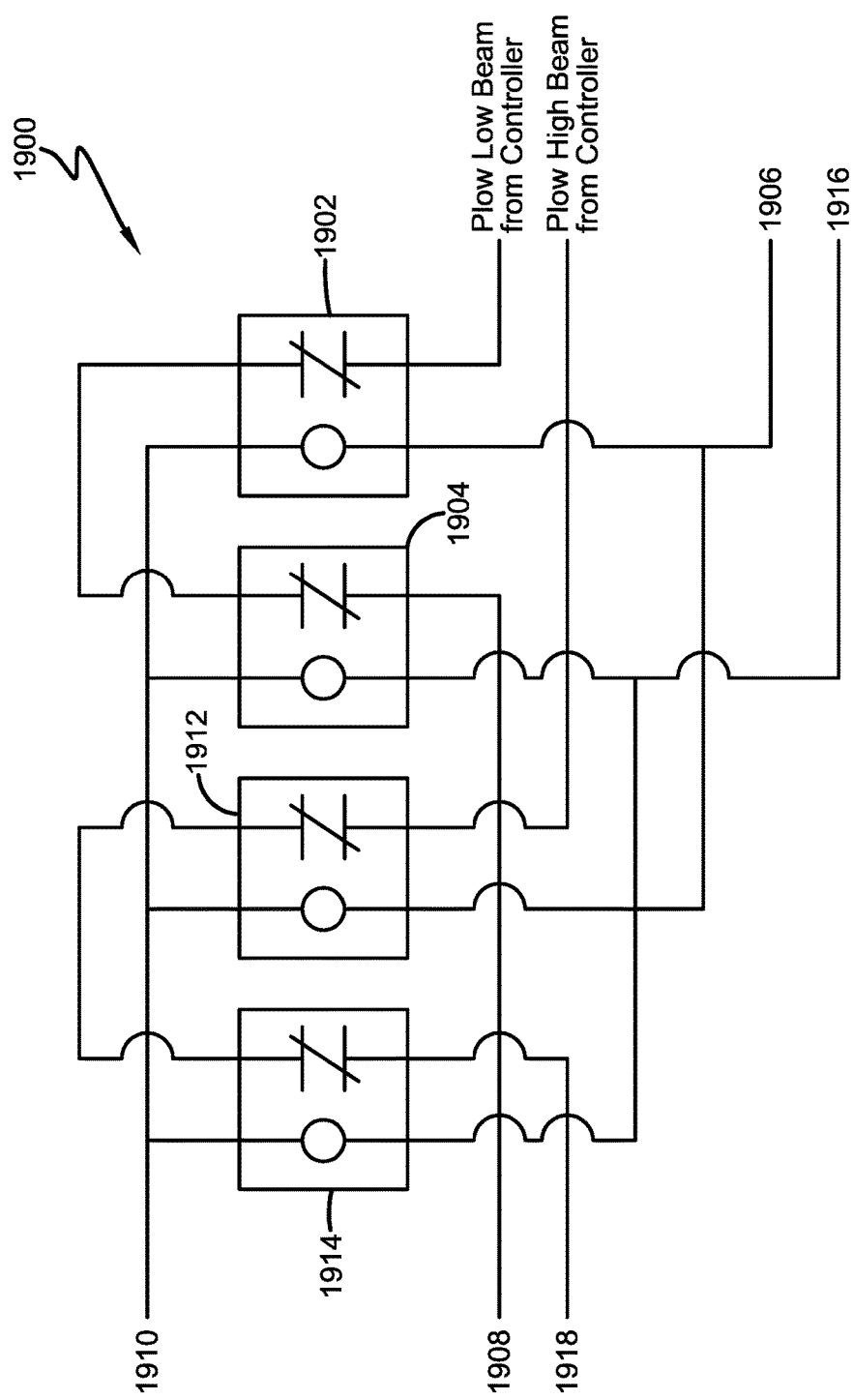
FIG. 27 is a schematic representation of a relay pack according to some aspects of the present teaching.

In other applications, by way of a non-limiting example in order to comply with vehicle operating regulations in some jurisdictions, according to some aspects of the present teaching, minor splicing or tying of wires into the vehicle's existing electrical system may be used. With reference now to FIG. 27, a relay pack 1900 can be tied into the vehicle's electrical system. A first relay 1902 and second relay 1904 can connect to the vehicle low beam via a wire tie 1906, to a plow light low beam 1908, to a plow controller 600, and a ground wire 1910. A third relay 1912 and fourth relay 1914 can likewise connect to the vehicle high beam via wire tie 1916, to the plow light high beam 1918, and to the plow controller 600 and ground wire 1910.

With continued reference to FIG. 27, the first through fourth relays 1902, 1904, 1912 and 1914 respectively of the relay pack 1900 are in a normally closed position wherein both the low beam and high beam circuit of the auxiliary lighting system 114 of the snowplow assembly 102 are interrupted when either the low beam or high beam of the vehicle's headlights are turned on. This normally closed condition of the relay pack 1900 prevents the simultaneous operation of the vehicle's headlight system and the auxiliary lighting system 114, as is required by vehicle operating laws in some jurisdictions. Turning off the vehicle's headlight system, or alternatively, powering the running lights of the vehicle, but not the low or high beams allows power to be supplied to the auxiliary lighting system 114. The auxiliary light low and/or high beams can then be powered via the plow controller 600. If the vehicle headlights are turned on while the auxiliary lighting system 114 is powered and the auxiliary lights 114 are illuminated, the relay pack 1900 will go to the open position, thereby interrupting power to the auxiliary lighting system 114 and powering off the auxiliary lights.

Still referring to FIG. 27, according to some aspects of the present teaching without a controller 600, the auxiliary lighting system 114 can include sensors or other means by which the lights can be illuminated when the vehicle's headlights are not in operation. By way of one non-limiting example, a sensor can be used to detect when the relay pack 1900 is closed, i.e. the vehicle's headlights are not illuminated, along with a sensor to detect ambient light levels. When the relay pack is closed 1900 and ambient light levels fall below a certain threshold, the auxiliary lighting system 114 can illuminate. By way of a second non-limiting example, the auxiliary lighting system 114 can have an "always on" condition wherein when the relay pack 1900 is closed, the auxiliary lights are illuminated. Other such sensors and conditions can be determined by a person of skill in the art.

With reference now to FIGS. 5-7, 10A-10D, 13-15, 19 and 23-26, according to some aspects of the present teaching, instead of auxiliary wiring 140, a transponder 800 may be electrically connected to and physically supported to the vehicle electric plug 60. According to some aspects of the present teaching, the transponder 800 can include a transponder electrical connector plug 802 which plugs into the vehicle electric plug 60. The specific transponder electrical connector plug 802 used may be configured to connect to the particular vehicle electric plug 60 type mounted to the vehicle. According to some aspects of the present teaching, the transponder plug 802 can be configured to align with a vehicle electric plug 60 such as the 7-way plug 300. According to some aspects of the present teaching, the transponder plug 802 can be configured to connect to a vehicle electric plug 60 such as a 6-way plug 316, a 5-way plug 318, or a 4-way plug 320.

With continuing reference to FIGS. 5-7, 10A-10D, 13-15, 19 and 23-26, according to some aspects of the present teaching the transponder 800 can include a housing 801 to which the transponder plug 802 is supported. The transponder 800 can also include several circuits that can perform one or more functions. The transponder 800 can, for example, include a receiving unit 900 which is supported to the housing 801 and which receives incoming signals from the vehicle via the vehicle electric plug 60. The receiver then directs the signal to the processing unit 902 which is also supported to the housing 801. The processing unit 902 can interpret the signal it receives to determine the appropriate signal it should send to the communication unit 904. The communication unit 904 may also be supported to the housing 801 and may transmit a corresponding wireless signal. The wireless signal can be radio frequency, WiFi, Bluetooth, or any other wireless transmission protocol capable of being broadcast over a wide enough distance to reliably reach the desired end point to control and/or power the auxiliary lighting system 102. According to some aspects of the present teaching, the transponder 800 can draw power directly from the vehicle's power supply 13 via the vehicle electric plug 60, such as auxiliary power connection 312 (shown in FIGS. 10A and 10B). According to some aspects of the present teaching, the transponder 800 may be powered directly by an independent power source 212 such as a battery which may be supported to the housing 801. According to some aspects of the present teaching, the transponder 800 can be mounted to and supported by the hitch receiver 200. According to some aspects of the present teaching, the transponder 800 can be mounted on and supported to the vehicle. According to some aspects of the present teaching, the transponder 800 cannot transfer power to the auxiliary light system 114 so another source of power may need to be supplied to the auxiliary lighting system 102. According to some aspects of the present teaching, the auxiliary lighting system 102 is powered by the vehicle's power source 13. In this case, appropriate wiring will have to be provided between the vehicle power source 13 and the auxiliary lighting system 102. According to some aspects of the present teaching, the auxiliary lighting system 102 may be powered by a separate power source 451 shown in FIG. 5, which may be a battery, which is part of the auxiliary implement 100.

With reference now to FIGS. 5-7 and 23-26, the auxiliary lighting system 102 may include a controller 600 that uses a microprocessor. Controller 600 may, according to some aspects of the present teaching, be a controller that controls not only the auxiliary lighting system 102, but also one or more other portions of the auxiliary implement 100. According to some aspects of the present teaching, the controller 600 may control only the auxiliary lighting system 102. Controller 600 may be mounted on the auxiliary implement 100. According to some aspects of the present teaching, the controller 600 can be mounted or on the vehicle, or within the engine compartment of the vehicle.

With continuing reference to FIGS. 5-7 and 23-26, the controller 600 may include several circuits that can perform one or more functions. The controller 600 may include a receiver 700 which receives incoming signals 710. According to some aspects of the present teaching, the signals 710 are sent by wires such as from the auxiliary wiring 140. According to some aspects of the present teaching, the incoming signals 710 are sent wirelessly (through radio frequency, WiFi, Bluetooth, or any other wireless transmission protocol) such as by the transponder 800. The receiver 700 then directs a corresponding signal to the microprocessor 702 which may be programmed to provide appropriate output(s) that may be directed to a power distribution circuit 704 which then sends the appropriate signals to the auxiliary lighting system 102. According to some aspects of the present teaching, the controller 600 may have one or more ports 602 as described above.

With reference now to FIGS. 5-7, 10A-10D, and 23-26, according to some aspects of the present teaching, the microprocessor 702 may be programmed to be used with the auxiliary lighting system 102 as will now be described. If the vehicle electric plug 60 includes a connection 308 for ground, this signal could be used for grounding purposes as is well known to those of skill in the art. The connections 302 and 304 for left and right turn signals can be used to control left and right turn signal lights on the auxiliary lighting system 102 similar to such lights that might be on a trailer and on the vehicle. If the vehicle electric plug 60 includes a connection 312 for auxiliary power, this connection could be used to power any component in any manner chosen by a person of skill in the art. Such a component may be an auxiliary lighting system 102 component and/or an auxiliary implement 100 component. Any vehicle electric plug connection that is not desired to be used can be repurposed or terminated, as determined by one of ordinary skill in the art. The connection 310 for trailer power brakes, for example, could be terminated.

With reference now to FIGS. 5-7 and 10A-10D, connections 302 and 304 can also be used for indicating that the vehicle operator has activated the vehicle brakes 24 as noted above. The connection 310 could also be used for this purpose. This braking signal could be used with the auxiliary lighting system 102 in a number of different ways. According to some aspects of the present teaching, one or more lights on the auxiliary lighting system 102 could be illuminated continuously for the duration of the braking event. According to some aspects of the present teaching, left and right turn signal lights on the auxiliary lighting system 102 could be controlled to flash on and off for the duration of the braking event. These features may be used indicate to observers in front of the vehicle that the vehicle is slowing and/or that they should exercise caution. The brake signal could also, according to some aspects of the present teaching, be used with respect to the auxiliary implement 100. In one non-limiting example, the brake signal could be used to adjust the position of the snowplow assembly. The connection 314 for reverse lights could also be used to change the illumination (higher or lower level or illumination) of the auxiliary lighting system 102, such as one or more of the auxiliary supplemental lights 112, when the vehicle brakes 24 are operated. This then would provide a clear signal to those near the vehicle that the vehicle is being braked.

With reference now to FIGS. 5-7, 10A-10D, and 23-26, as explained above, the vehicle's electric plug 60 may use one or more common wires for both a turn signal and a brake signal. To prevent the front facing auxiliary turn signal lights 114, 114 from going into an ON condition when the vehicle's brakes are applied, the microprocessor 702 may be programmed to perform the following function set: (1) operate one or more front facing auxiliary turn signal lights 114, 114 of the auxiliary lighting system 102 into an ON condition when the electric plug 60 indicates that the vehicle 10 has a corresponding turn signal (right or left side) that is in an ON condition; (2) operate one or more of the front facing auxiliary turn signal lights 114, 114 into an OFF condition when the electric plug 60 indicates that the vehicle 10 has a corresponding turn signal (right or left side) that is in an OFF condition; and, (3) operate to prevent the front facing auxiliary turn signal light(s) 114, 114 from going into an ON condition when the electric plug 60 indicates that: (a) the vehicle's turn signal is in an OFF condition; and, (b) a brake on the vehicle has been activated.

The microprocessor 702 can be programmed to perform the function set of the previous paragraph in any manner chosen with the sound judgment of a person of skill in the art. According to some aspects of the present teaching, the microprocessor 702 may determine that a front facing auxiliary turn signal light 114 should be prevented from going into an ON condition when the electric plug 60 indicates that both vehicle turn signals are in an ON condition for a predetermined period of time, such as for one second or more. This would only occur when the vehicle's brakes have been applied. According to some aspects of the present teaching, when the electric plug 60 indicates that only one of the vehicle turn signals is in an ON condition, the microprocessor 702 can be programmed to interpret this as meaning the corresponding auxiliary turn signal light 114 (right or left side) should be placed into the ON condition.

With continuing reference to FIGS. 5-7, 10A-10D, and 23-26, as explained above, to prevent the auxiliary turn signal lights (whether or not front facing) from operating as hazard lights, the microprocessor 702 may be programmed to perform the following function set: (1) operate a first auxiliary turn signal light of the auxiliary lighting system 102 into an ON condition when the electric plug 60 indicates that the vehicle 10 has a first turn signal that is in an ON condition; (2) operate the first auxiliary turn signal light into an OFF condition when the electric plug 60 indicates that the vehicle's first turn signal is in an OFF condition; (3) operate a second auxiliary turn signal light of the auxiliary lighting system 102 into an ON condition when the electric plug 60 indicates that the vehicle has a second turn signal that is in an ON condition; (4) operate the second auxiliary turn signal light into an OFF condition when the electric plug 60 indicates that the vehicle's second turn signal is in an OFF condition; (5) operate to prevent the first auxiliary turn signal light from going into an ON condition when the electric plug 60 indicates that: (a) the vehicle's first turn signal is in an OFF condition; and, (b) a brake on the vehicle has been activated; (6) operate to prevent the second auxiliary turn signal light from going into an ON condition when the electric plug 60 indicates that: (a) the vehicle's second turn signal is in an OFF condition; and, (b) a brake on the vehicle has been activated; and, (7) operate the first and second auxiliary turn signal lights into ON and OFF conditions that match the ON and OFF conditions of the vehicle's first and second turn signals when the electric plug 60 indicates that the vehicle's first and second turn signals are simultaneously alternating between ON and OFF conditions.

The microprocessor 702 can be programmed to perform the function set of the previous paragraph in any manner chosen with the sound judgment of a person of skill in the art. According to some aspects of the present teaching, the microprocessor 702 may determine that the auxiliary turn signal lights (whether or not front facing) should be prevented from going into an ON condition when the electric plug 60 indicates that both vehicle turn signals are in an ON condition for a predetermined period of time, as explained above. According to some aspects of the present teaching, the microprocessor 702 may determine that the auxiliary turn signal lights (whether or not front facing) should be permitted to alternate between ON and OFF conditions that match the ON and OFF conditions of the vehicle (this happens, for example, when the vehicle's hazard lights have been activated) based on signals from the electric plug 60. The microprocessor 70 may be programmed to distinguish between braking signals and hazard signals based on the regularity, frequency, and total number of signals from the electric plug 60. If the vehicle's first and second turn signals are not ON simultaneously, for example, this would indicate that the vehicle is neither braking nor in a hazard condition. If the vehicle's first and second turn signals are on simultaneously and with the same frequency, this would indicate that the vehicle is not in braking but is in a hazard condition. The number of simultaneous signals at the same frequency could also be used to indicate a hazard condition.

Still referring to FIGS. 5-7, 10A-10D, and 23-26, to prevent the vehicle 10 from disabling features that are desirable even when the electric plug 60 is in use, the microprocessor 702 may be programmed to perform the following function set: (1) operate at least one auxiliary light of the auxiliary lighting system 102 based on an indication from the electric plug 60; and, (2) operate to prevent the electronic control unit 128 on the vehicle from detecting that the controller 600 is electrically connected to the electric plug 60. Any of the auxiliary lights may be operated in this function set.

Figure 28:
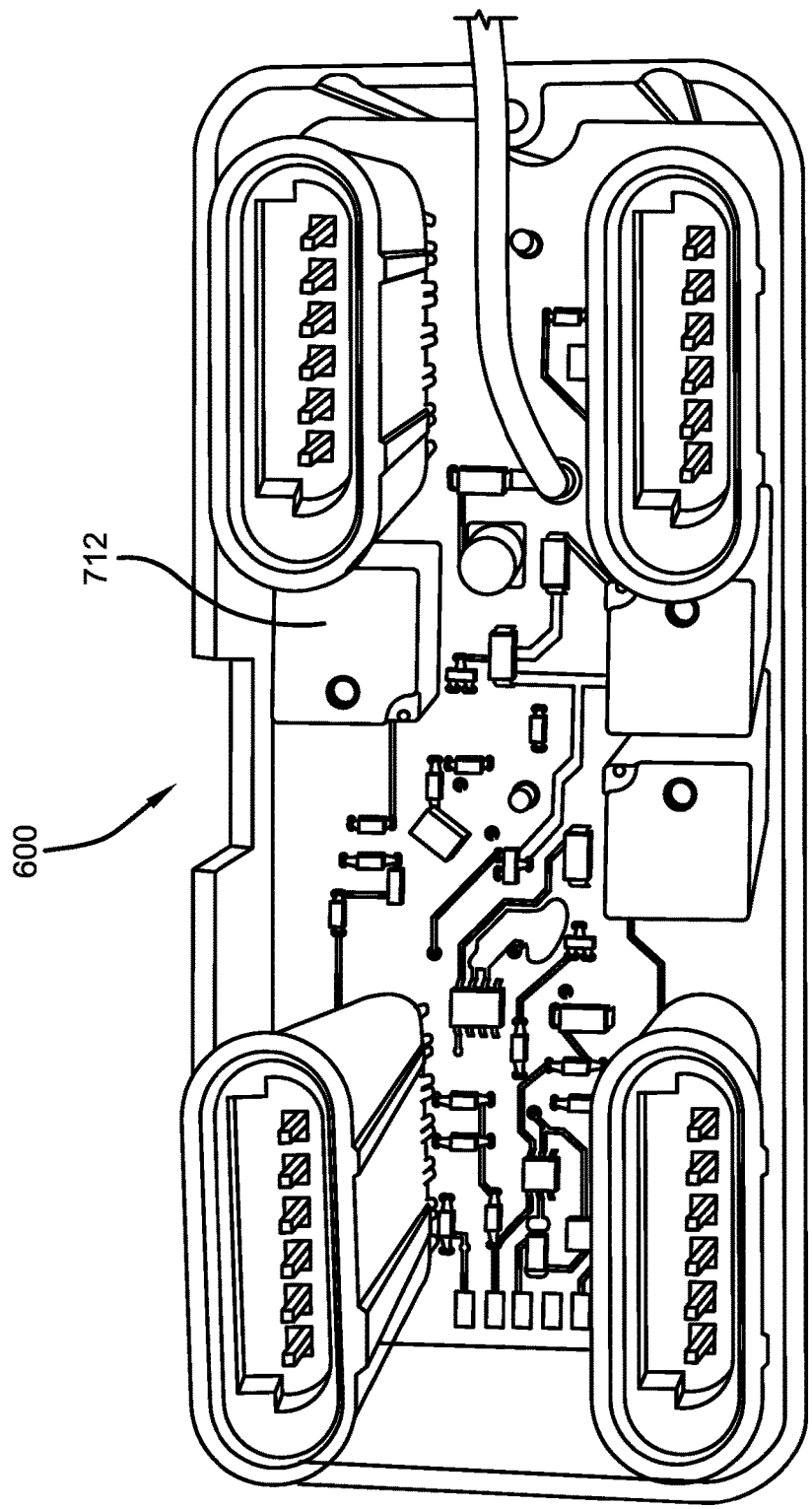
FIG. 28 shows a controller with the housing removed according to some aspects of the present teaching.

The microprocessor 702 can be programmed to perform the function set of the previous paragraph in any manner chosen with the sound judgment of a person of skill in the art. According to some aspects of the present teaching, the microprocessor 702 may be programmed to prevent the electronic control unit 128 on the vehicle from detecting any amperage/power draw from the electric plug 60. According to some aspects of the present teaching, the at least one auxiliary light may be powered from a source other than the electric plug 60. The auxiliary light may be powered, according to some aspects of the present teaching, by the vehicle power source 13 which may be a battery 12. As shown in FIG. 28, the controller 600 may include a relay 712, which may be a micro-relay. The relay 712 may receive an indication from the electric plug 60 regarding the operation of a light corresponding to one or more auxiliary lights. The relay 712 may take that indication and connect another power source to the one or more auxiliary lights in place of the electric plug 60. In this way the electronic control unit 128 will maintain the features that would otherwise be disabled despite the use of the electric plug 60 for the auxiliary lighting system.

According to some aspects of the present teaching, the vehicle electric plug 60 can also be used to control auxiliary headlights 40 in any manner chosen with the sound judgment of a person of skill in the art. In one non-limiting example, it is common for vehicle light controls to be adjustable between: (1) an "off" or no power condition; (2) park or running lights "on" condition; (3) headlights "on" condition; and, (4) headlight high beams "on" condition. When the vehicle lights are in the off condition, no power goes to the vehicle head lights or high beams or to the vehicle's tail lights. In this case, connection 306 for tail lights would not be powered and the microprocessor 702 may be programmed to use this signal as an indication to provide no power to the auxiliary headlights—thus an "off" condition for the auxiliary headlights to match the vehicle headlights. When the vehicle lights are in any of the on conditions (whether park or running lights on, or headlights on, or high beams on), connection 306 for tail lights would be powered (an "on" condition) and the microprocessor 702 may be programmed to use this signal as an indication to provide power to the auxiliary headlights—thus an "on" condition for the auxiliary headlights. Whenever the auxiliary lighting system 102 is attached to the vehicle, the vehicle operator may treat all "headlight on" conditions (conditions 2, 3 and 4 discussed above) the same; namely, manually adjusting the vehicle light controls to be in the park or running lights "on" condition. In this way, neither the vehicle headlights nor the vehicle high beams will be "on" and thus will not reflect off of the auxiliary implement 100 back to the vehicle thereby interfering with the operator's vision.

According to some aspects of the present teaching, a signal may be communicated from the vehicle electric plug 60 through the auxiliary wiring 140 and eventually to the microprocessor 702. According to some aspects of the present teaching described above, a signal is communicated from the vehicle electric plug 60 through the transponder 800 then wirelessly from the transponder and eventually to the microprocessor 702. As is well known to those of skill in the art, a microprocessor operates based on the signal it receives from an input. As explained above, the signal that reaches the microprocessor 702 may come from a component intermediate the signal from the auxiliary wiring 140 or transponder 800—such as from the receiver 700. Additional and/or alternative intermediate components may also be used according to some aspects of the present teaching. For clarity, the expression "directly or indirectly" may be used in this patent with regard to signals (whether wired or wireless). It is to be understood that "directly" means a signal that travels directly from one component to a second component and indirectly" means a signal that travels from one component to a second component but with one or more intermediate components also used. Thus, for example, a signal that travels from auxiliary wiring 140 to microprocessor 702 with no intermediate components would be a direct signal. In this case, the microprocessor's operation may be said to be based directly on the signal. In another example, a signal that travels from the auxiliary wiring 140 to microprocessor 702 with one or more intermediate components (such as receiver 700) would be an indirect signal. In this case, the microprocessor's operation may be said to be based indirectly on the signal—regardless of what and how many intermediate components may be used. As another example, a wireless signal that travels from transponder 800 to microprocessor 702 with no intermediate components would be a direct signal. In this case, the microprocessor's operation may be said to be based directly on the wireless signal. In yet another example, a wireless signal that travels from transponder 800 to microprocessor 702 with one or more intermediate components (such as receiver 700) would be an indirect wireless signal. In this case, the microprocessor's operation may be said to be based indirectly on the wireless signal—regardless of what and how many intermediate components may be used.

To use this invention according to some aspects of the present teaching, the operator may first acquire the proper auxiliary wiring 140 to match the vehicle's electric plug 60 and the auxiliary lighting system 102 including, when used, the controller 600. The operator may then attach the auxiliary wiring 140 to the vehicle—some aspects of the present teaching of this attachment are described above. The operator may then electrically connect the auxiliary wiring 140, which may include the auxiliary plug 142, into the vehicle electric plug 60. The operator may then connect the auxiliary wiring 140 to the auxiliary lighting system 102. According to some aspects of the present teaching, the auxiliary wiring 140 may be connected to the controller 600 or to another component which is ultimately connected to the controller 600. This may complete the attachment. In use, the operator may simply adjust the vehicle lights, typically using vehicle light controls within the vehicle, to match the atmospheric light condition. If the atmospheric light condition is relatively lighter, there may be no need to turn on the vehicle lights. As a result, the vehicle electric plug 60 may indicate that no tail lights are required. The microprocessor 702 may use that indication to keep the auxiliary headlight(s) in an off condition. If the atmospheric light condition is relatively darker, there may be a need for the operator to turn on the vehicle lights. As a result of the operator turning on the vehicle lights, the vehicle electric plug 60 may indicate that tail lights are required. The microprocessor 702 may use that indication to place the auxiliary headlight(s) in an on condition. Turn signals, if applicable, may be used as described above. Similarly, a brake signal, if applicable, may be used as described above.

To use this invention according to some aspects of the present teaching, the operator may first acquire the proper transponder 800 to match the vehicle's electric plug 60 and the auxiliary lighting system 102 including, when applicable, the controller 600. The operator may then attach the transponder 800 to the vehicle—non-limiting options for this attachment are described above. The operator may then electrically connect the transponder 800 to the vehicle electric plug 60. Non-limiting options for this connection are described above. This may complete the attachment. In use, the operator may simply adjust the vehicle lights, typically using vehicle light controls within the vehicle, to match the atmospheric light condition. If the atmospheric light condition is relatively lighter, there may be no need to turn on the vehicle lights. As a result, the vehicle electric plug 60 may indicate that no tail lights are required. The microprocessor 702 may use that indication to keep the auxiliary headlight(s) in an off condition. If the atmospheric light condition is relatively darker, there may be a need for the operator to turn on the vehicle lights. As a result of the operator turning on the vehicle lights, the trailer plug 202 may indicate that tail lights are required. The microprocessor 702 may use that indication to place the auxiliary headlight(s) in an on condition. Turn signals, if applicable, may be used as described above. Similarly, a brake signal, if applicable, may be used as described above.

To use this invention according to some aspects of the present teaching, the operator may first acquire the proper auxiliary wiring 140 to match the vehicle's electric plug 60 and the auxiliary lighting system 102. The operator may then attach the auxiliary wiring 140 to the vehicle—non-limiting options for this attachment are described above. The operator may then electrically connect the auxiliary wiring 140 to the vehicle electric plug 60, to the power source 13, to the auxiliary implement 100, to the auxiliary lighting system 102, to the operator adjustable auxiliary implement control 104 and to the operator adjustable auxiliary light control 116. This may complete the attachment. As explained above, these electrical connections may be simple "plug in" attachments. In use, the operator may simply adjust the operator adjustable vehicle light control 20 to operate the auxiliary supplemental lights 112, auxiliary turn signal lights and/or auxiliary park lights for example, based directly or indirectly on the electric signal transmitted from the vehicle electric plug 60. The operator may also simply adjust the operator adjustable auxiliary light control 116 to operate the auxiliary headlights 110 to illuminate the ground surface upon which the vehicle travels in place of the vehicle headlights 14. Finally, the operator may simply adjust the operator adjustable auxiliary implement control 104 to operate at least one function of the auxiliary implement 100—for example, to raise or lower a snowplow blade 106.

As described above, the present disclosure has been described with preferred embodiments thereof and it is understood that many changes and modifications to the described embodiments can be carried out without departing from the scope and the spirit of the present disclosure that is intended to be limited only by the appended claims.

In the patent claims that follow, it should be understood that any component referred to as being "associated" is not being claimed positively but rather indicates the environment in which the claimed invention is used. Thus, for a non-limiting example, if a patent claim includes "an auxiliary apparatus for use with an associated vehicle" then Applicant's intent is that infringement does not require a vehicle. Rather, infringement only requires an auxiliary apparatus that is capable of being used with a vehicle.

What is claimed:

1. An auxiliary apparatus for use with an associated vehicle having: a vehicle light that is designed to illuminate a ground surface in front of the vehicle; and, an electric plug, the auxiliary apparatus comprising:
   an auxiliary snow and/or ice removal implement that: is removably mountable to the vehicle; and, obscures light from the vehicle light when mounted to the vehicle;
   an auxiliary lighting system that: is for use with the auxiliary snow and/or ice removal implement; and, comprises at least one auxiliary headlight designed to illuminate the ground surface in front of the vehicle; and,
   a controller that: is electrically connectable to the electric plug and the auxiliary lighting system; and, comprises a microprocessor that is programmed to perform at least one of the following function sets:
   function set A:
      (1) operate a front facing auxiliary turn signal light of the auxiliary lighting system into an ON condition when the electric plug indicates that the vehicle has a turn signal that is in an ON condition;
      (2) operate the front facing auxiliary turn signal light into an OFF condition when the electric plug indicates that the vehicle's turn signal is in an OFF condition; and,
      (3) operate to prevent the front facing auxiliary turn signal light from going into an ON condition when the electric plug indicates that: (a) the vehicle's turn signal is in an OFF condition; and, (b) a brake on the vehicle has been activated;
   function set B:
      (1) operate a first auxiliary turn signal light of the auxiliary lighting system into an ON condition when the electric plug indicates that the vehicle has a first turn signal that is in an ON condition;
      (2) operate the first auxiliary turn signal light into an OFF condition when the electric plug indicates that the vehicle's first turn signal is in an OFF condition;
      (3) operate a second auxiliary turn signal light of the auxiliary lighting system into an ON condition when the electric plug indicates that the vehicle has a second turn signal that is in an ON condition;
      (4) operate the second auxiliary turn signal light into an OFF condition when the electric plug indicates that the vehicle's second turn signal is in an OFF condition;
      (5) operate to prevent the first auxiliary turn signal light from going into an ON condition when the electric plug indicates that: (a) the vehicle's first turn signal is in an OFF condition; and, (b) a brake on the vehicle has been activated;
      (6) operate to prevent the second auxiliary turn signal light from going into an ON condition when the electric plug indicates that: (a) the vehicle's second turn signal is in an OFF condition; and, (b) a brake on the vehicle has been activated;
      (7) operate the first and second auxiliary turn signal lights into ON and OFF conditions that match the ON and OFF conditions of the vehicle's first and second turn signals when the electric plug indicates that the vehicle's first and second turn signals are simultaneously alternating between ON and OFF conditions; and,
   function set C:
      (1) operate at least one auxiliary light of the auxiliary lighting system based on an indication from the electric plug; and,
      (2) operate to prevent an electronic control unit on the vehicle from detecting that the controller is electrically connected to the electric plug.

2. The auxiliary apparatus of claim 1 wherein:
the microprocessor is programmed to perform function sets A and B.

3. The auxiliary apparatus of claim 1 wherein:
the microprocessor is programmed to perform function sets B and C.

4. The auxiliary apparatus of claim 1 wherein:
the microprocessor is programmed to perform function sets A, B and C.

5. The auxiliary apparatus of claim 1 further comprising:
auxiliary wiring that is: (1) electrically hardwire connectable to the electric plug; and, (2) electrically hardwire connectable to at least one of the auxiliary lighting system and the controller.

6. The auxiliary apparatus of claim 1 wherein:
the microprocessor is programmed to perform function set C; and,
the microprocessor is programmed to prevent the electronic control unit on the vehicle from detecting any amperage draw from the electric plug.

7. The auxiliary apparatus of claim 1 wherein:
the microprocessor is programmed to perform function set C; and, the at least one auxiliary light of the auxiliary lighting system is powered from a source other than the electric plug.

8. An auxiliary apparatus for use with an associated vehicle having an electric plug, the auxiliary apparatus comprising:
an auxiliary implement that: is removably mountable to the vehicle; and, obscures light from at least one vehicle light designed to illuminate a ground surface in front of the vehicle when mounted to the vehicle;
an auxiliary lighting system for use with the auxiliary implement; and,
a controller that: is electrically connectable to the electric plug and, the auxiliary lighting system; and, comprises a microprocessor that is programmed to perform at least one of the following function sets:
function set A:
  (1) operate a front facing auxiliary turn signal light of the auxiliary lighting system into an ON condition when the electric plug indicates that the vehicle has a turn signal that is in an ON condition;
  (2) operate the front facing auxiliary turn signal light into an OFF condition when the electric plug indicates that the vehicle's turn signal is in an OFF condition; and,
  (3) operate to prevent the front facing auxiliary turn signal light from going into an ON condition when the electric plug indicates that: (a) the vehicle's turn signal is in an OFF condition; and, (b) a brake on the vehicle has been activated;
function set B:
  (1) operate a first auxiliary turn signal light of the auxiliary lighting system into an ON condition when the electric plug indicates that the vehicle has a first turn signal that is in an ON condition;
  (2) operate the first auxiliary turn signal light into an OFF condition when the electric plug indicates that the vehicle's first turn signal is in an OFF condition;
  (3) operate a second auxiliary turn signal light of the auxiliary lighting system into an ON condition when the electric plug indicates that the vehicle has a second turn signal that is in an ON condition;
  (4) operate the second auxiliary turn signal light into an OFF condition when the electric plug indicates that the vehicle's second turn signal is in an OFF condition;
  (5) operate to prevent the first auxiliary turn signal light from going into an ON condition when the electric plug indicates that: (a) the vehicle's first turn signal is in an OFF condition; and, (b) a brake on the vehicle has been activated;
  (6) operate to prevent the second auxiliary turn signal light from going into an ON condition when the electric plug indicates that: (a) the vehicle's second turn signal is in an OFF condition; and, (b) a brake on the vehicle has been activated; and,
  (7) operate the first and second auxiliary turn signal lights into ON and OFF conditions that match the ON and OFF conditions of the vehicle's first and second turn signals when the electric plug indicates that the vehicle's first and second turn signals are simultaneously alternating between ON and OFF conditions; and,
function set C:
  (1) operate at least one auxiliary light of the auxiliary lighting system based on an indication from the electric plug; and,
  (2) operate to prevent an electronic control unit on the vehicle from detecting that the controller is electrically connected to the electric plug.

9. The auxiliary apparatus of claim 8 wherein:
the microprocessor is programmed to perform function sets A and B.

10. The auxiliary apparatus of claim 8 wherein:
the microprocessor is programmed to perform function sets B and C.

11. The auxiliary apparatus of claim 8 wherein:
the microprocessor is programmed to perform function sets A, B and C.

12. The auxiliary apparatus of claim 8 further comprising:
auxiliary wiring that is: (1) electrically hardwire connectable to the electric plug; and, (2) electrically hardwire connectable to at least one of the auxiliary lighting system and the controller.

13. The auxiliary apparatus of claim 8 wherein:
the auxiliary implement is a snowplow assembly.

14. The auxiliary apparatus of claim 8 wherein:
the auxiliary lighting system comprises at least one auxiliary headlight designed to illuminate the ground surface in front of the vehicle.

15. An auxiliary lighting system and controller for use with: (A) an associated vehicle having: a vehicle light that is designed to illuminate a ground surface in front of the vehicle; and, an electric plug; and, (B) an associated implement that obscures light from the vehicle light; the auxiliary lighting system and controller comprising:
an auxiliary lighting system that; is removably mountable to at least one of the vehicle and the implement; and, comprises at least one auxiliary headlight designed to illuminate the ground surface in front of the vehicle; and,
a controller that: is electrically connectable to the electric plug and the auxiliary lighting system; and, comprises a microprocessor that is programmed to perform at least one of the following function sets:
function set A:
  (1) operate a front facing auxiliary turn signal light of the auxiliary lighting system into an ON condition when the electric plug indicates that the vehicle has a turn signal that is in an ON condition;
  (2) operate the front facing auxiliary turn signal light into an OFF condition when the electric plug indicates that the vehicle's turn signal is in an OFF condition; and,
  (3) operate to prevent the front facing auxiliary turn signal light from going into an ON condition when the electric plug indicates that: (a) the vehicle's turn signal is in an OFF condition; and, (b) a brake on the vehicle has been activated;
function set B:
  (1) operate a first auxiliary turn signal light of the auxiliary lighting system into an ON condition when the electric plug indicates that the vehicle has a first turn signal that is in an ON condition;
  (2) operate the first auxiliary turn signal light into an OFF condition when the electric plug indicates that the vehicle's first turn signal is in an OFF condition;
  (3) operate a second auxiliary turn signal light of the auxiliary lighting system into an ON condition when the electric plug indicates that the vehicle has a second turn signal that is in an ON condition;

(4) operate the second auxiliary turn signal light into an OFF condition when the electric plug indicates that the vehicle's second turn signal is in an OFF condition;

(5) operate to prevent the first auxiliary turn signal light from going into an ON condition when the electric plug indicates that: (a) the vehicle's first turn signal is in an OFF condition; and, (b) a brake on the vehicle has been activated;

(6) operate to prevent the second auxiliary turn signal light from going into an ON condition when the electric plug indicates that: (a) the vehicle's second turn signal is in an OFF condition; and, (b) a brake on the vehicle has been activated; and, (7) operate the first and second auxiliary turn signal lights into ON and OFF conditions that match the ON and OFF conditions of the vehicle's first and second turn signals when the electric plug indicates that the vehicle's first and second turn signals are simultaneously alternating between ON and OFF conditions; and, function set C:

(1) operate at least one auxiliary light of the auxiliary lighting system based on an indication from the electric plug; and, (2) operate to prevent an electronic control unit on the vehicle from detecting that the controller is electrically connected to the electric plug.

16. The auxiliary lighting system and controller of claim 15 wherein:
the microprocessor is programmed to perform function sets A and B.

17. The auxiliary lighting system and controller of claim 15 wherein:
the microprocessor is programmed to perform function sets B and C.

18. The auxiliary lighting system and controller of claim 15 wherein:
the microprocessor is programmed to perform function sets A, B and C.

19. The auxiliary lighting system and controller of claim 15 further comprising:
auxiliary wiring that is: (1) electrically hardwire connectable to the electric plug; and, (2) electrically hardwire connectable to at least one of the auxiliary lighting system and the controller.

20. The auxiliary lighting system and controller of claim 15 wherein:
the auxiliary lighting system comprises at least one auxiliary headlight designed to illuminate the ground surface in front of the vehicle.

* * * * *